(12) United States Patent
Blumkin et al.

(10) Patent No.: US 9,756,431 B2
(45) Date of Patent: Sep. 5, 2017

(54) LASER-BASED DEVICE UTILIZING MULTIPLE LASER BEAMS

(71) Applicant: VocalZoom Systems Ltd., Yokneam Illit (IL)

(72) Inventors: Alexander Blumkin, Nazareth Illit (IL); Amir Ganani, Zikhron Ya'kov (IL); Tal Fishman, Haifa (IL); Tal Bakish, Modi'in (IL)

(73) Assignee: VOCALZOOM SYSTEMS LTD., Yokneam Illit (IL)

( * ) Notice: Subject to any disclaimer, the term of this patent is extended or adjusted under 35 U.S.C. 154(b) by 12 days.

(21) Appl. No.: 14/997,533

(22) Filed: Jan. 17, 2016

(65) Prior Publication Data
US 2017/0207856 A1    Jul. 20, 2017

(51) Int. Cl.
*H04R 23/00* (2006.01)
*H04B 10/564* (2013.01)
*H04B 10/50* (2013.01)

(52) U.S. Cl.
CPC ......... *H04R 23/008* (2013.01); *H04B 10/503* (2013.01); *H04B 10/506* (2013.01); *H04B 10/564* (2013.01)

(58) Field of Classification Search
CPC ............................ H04R 23/008; H04B 10/572
USPC .................................. 398/132–134; 381/172
See application file for complete search history.

(56) References Cited

U.S. PATENT DOCUMENTS

| | | | |
|---|---|---|---|
| 6,288,809 B1 * | 9/2001 | Touma .................. | H04J 3/1694 398/9 |
| 2005/0238188 A1 * | 10/2005 | Wilcox ................ | H04R 23/008 381/172 |
| 2008/0316588 A1 * | 12/2008 | Enoch .................... | H04B 10/00 359/326 |
| 2011/0273699 A1 * | 11/2011 | Sebastian ................ | G01C 3/08 356/4.09 |
| 2016/0302010 A1 * | 10/2016 | Sebastian ............. | H04R 23/008 |

OTHER PUBLICATIONS

Yule, The Acoustic-Optical Microphone, published Apr. 2014 at https://solentacoustics.wordpress.com/2014/04/02/the-acoustic-optical-microphone/.*

* cited by examiner

*Primary Examiner* — David Payne
*Assistant Examiner* — Casey Kretzer
(74) *Attorney, Agent, or Firm* — Eitan, Mehulal & Sadot

(57) ABSTRACT

A laser-based device or sensor includes: a first laser transmitter having a first self-mix carrier frequency; a second laser transmitter having a second, different, self-mix carrier frequency; a first monitor photodiode to receive a first optical signal from the first laser transmitter, and to output a first electric signal; a second monitor photodiode to receive a first optical signal from the second laser transmitter, and to output a second electric signal; an electric connection to connect together the first electric signal and the second electric signal, forming a combined electric signal; a single laser receiver to receive the combined electric signal and to generate from it a spectrum that corresponds to both (i) optical feedback of the first laser transmitter, and (ii) optical feedback of the second laser transmitter. Alternatively, a single monitor photodiode is used, receiving optical signals from multiple laser transmitters, and outputting a single electric signal to a single laser receiver.

2 Claims, 14 Drawing Sheets

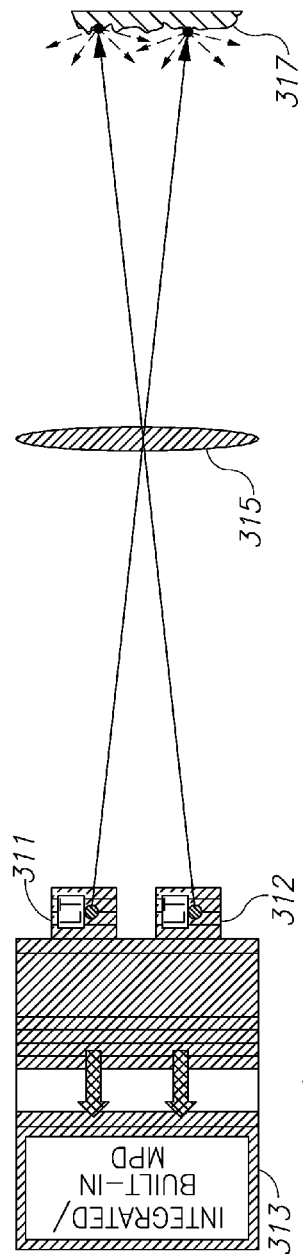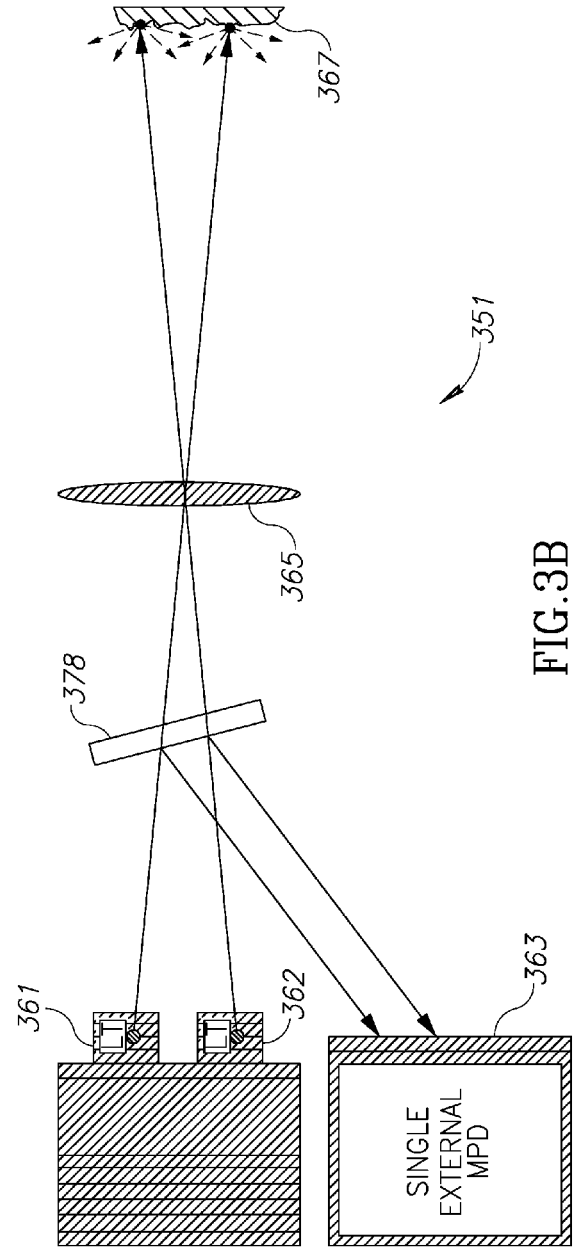
FIG.3A
FIG.3B

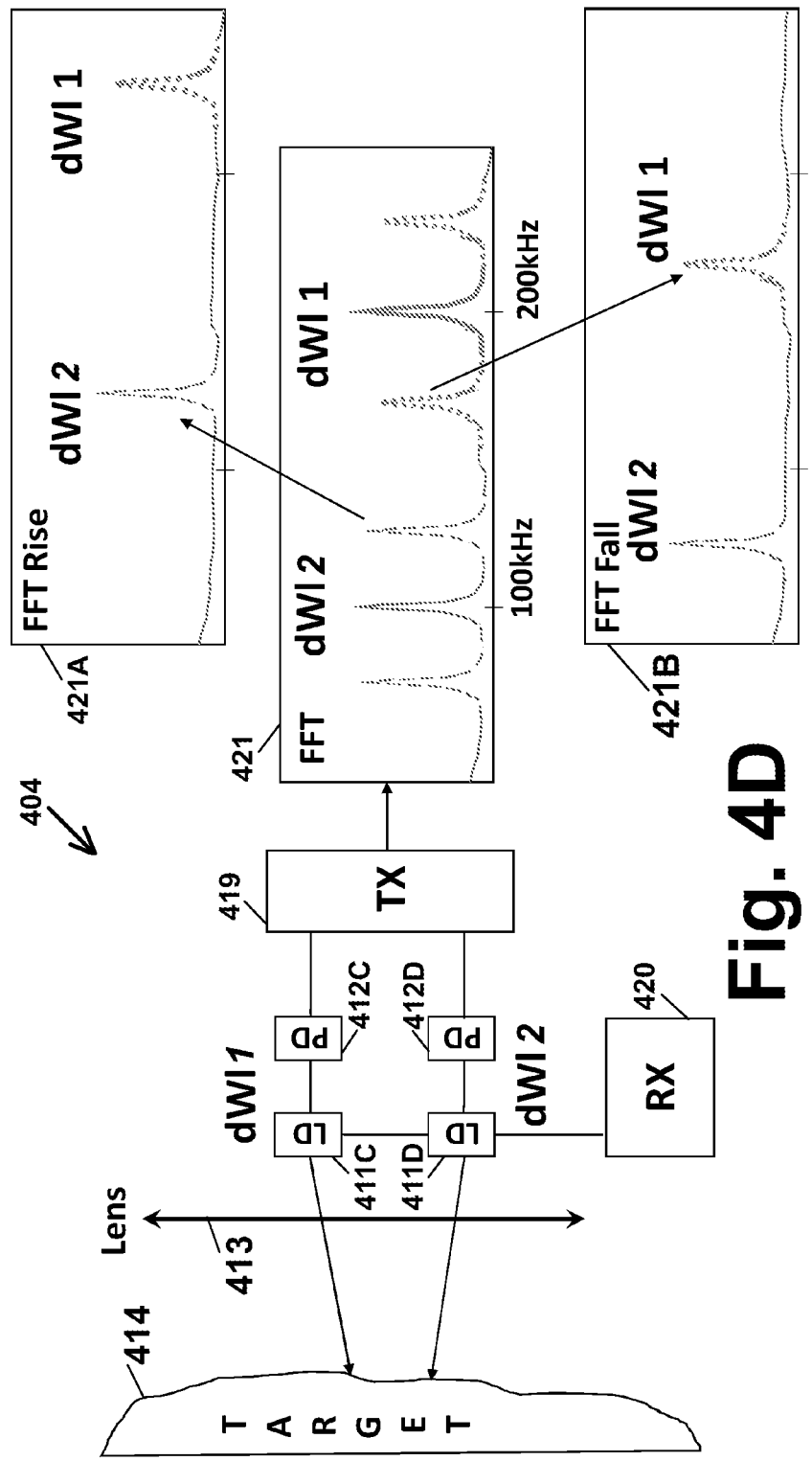

LASER-BASED DEVICE UTILIZING MULTIPLE LASER BEAMS

FIELD OF THE INVENTION

The present invention relates to the field of devices that utilize laser beams.

BACKGROUND OF THE INVENTION

Millions of people users worldwide utilize a variety of electronic devices that may receive, capture or otherwise process audio signals. For example, cellular phones and smartphones comprise an audio microphone, allowing a user to conduct a telephone call with a remote user. Similarly, a smartphone typically comprises an audio microphone and a video camera, allowing the user to record an audio/video clip. Additionally, many laptop computers as well as tablets are typically equipped with an audio microphone able to capture audio.

Unfortunately, an audio microphone typically capture a desired audio signal (e.g., a voice of a human speaker) together with background noise, interferences, ambient noises, environmental noises, and/or audio from other non-desired sources.

SUMMARY OF THE INVENTION

Some embodiments of the present invention may comprise systems, devices, and method for utilizing multiple lasers or multiple laser beams or multiple laser transmitters, or a laser array or laser matrix, in conjunction with a single laser drive component and/or a single laser receiver component.

Some embodiments of the present invention may comprise an optical microphone or laser microphone or a laser-based microphone, or optical sensor or laser sensor or laser-based sensor, which utilizes multiple lasers or multiple laser beams or multiple laser transmitters, in conjunction with a single laser drive component and/or a single laser receiver component, or in conjunction with a single monitor photodiode (MPD) that is connected to a single laser receiver, or in conjunction with multiple MPDs that are connected to a single laser receiver; thereby increasing or improving efficiency of self-mix techniques or module or chamber (or self-mix interferometry techniques or module or chamber) utilized by such optical or laser-based microphone or sensor, and thereby enabling a possible reduction in manufacturing cost and/or enabling a reduced form factor for the entire laser-based device or laser-based microphone (e.g., due to utilization of a single laser receiver instead of multiple, separate, laser receivers).

Some embodiments of the present invention may comprise a hybrid sensor or hybrid device or hybrid unit or hybrid microphone, for example, an acoustic/optical sensor or acoustic/optical microphone, which may comprise: (a) an acoustic microphone or audio microphone; and also (b) an optical microphone or laser microphone or a laser-based microphone which utilizes multiple lasers or multiple laser beams or multiple laser transmitters, in conjunction with a single laser drive component and/or a single laser receiver component. Optionally, optical feedback received by the laser microphone, may be used in order to improve, enhance, filter and/or clean noises from the acoustic signal captured by the acoustic microphone.

The present invention may provide other and/or additional advantages and/or benefits.

BRIEF DESCRIPTION OF THE DRAWINGS

FIG. 3A is a schematic illustration of a laser system, in accordance with some demonstrative embodiments of the present invention;

FIG. 3B is a schematic illustration of a laser system, in accordance with some demonstrative embodiments of the present invention;

FIGS. 4A-4E are schematic illustrations of laser systems, in accordance with some demonstrative embodiments of the present invention;

DETAILED DESCRIPTION OF SOME EMBODIMENTS OF THE INVENTION

Figure 1A:
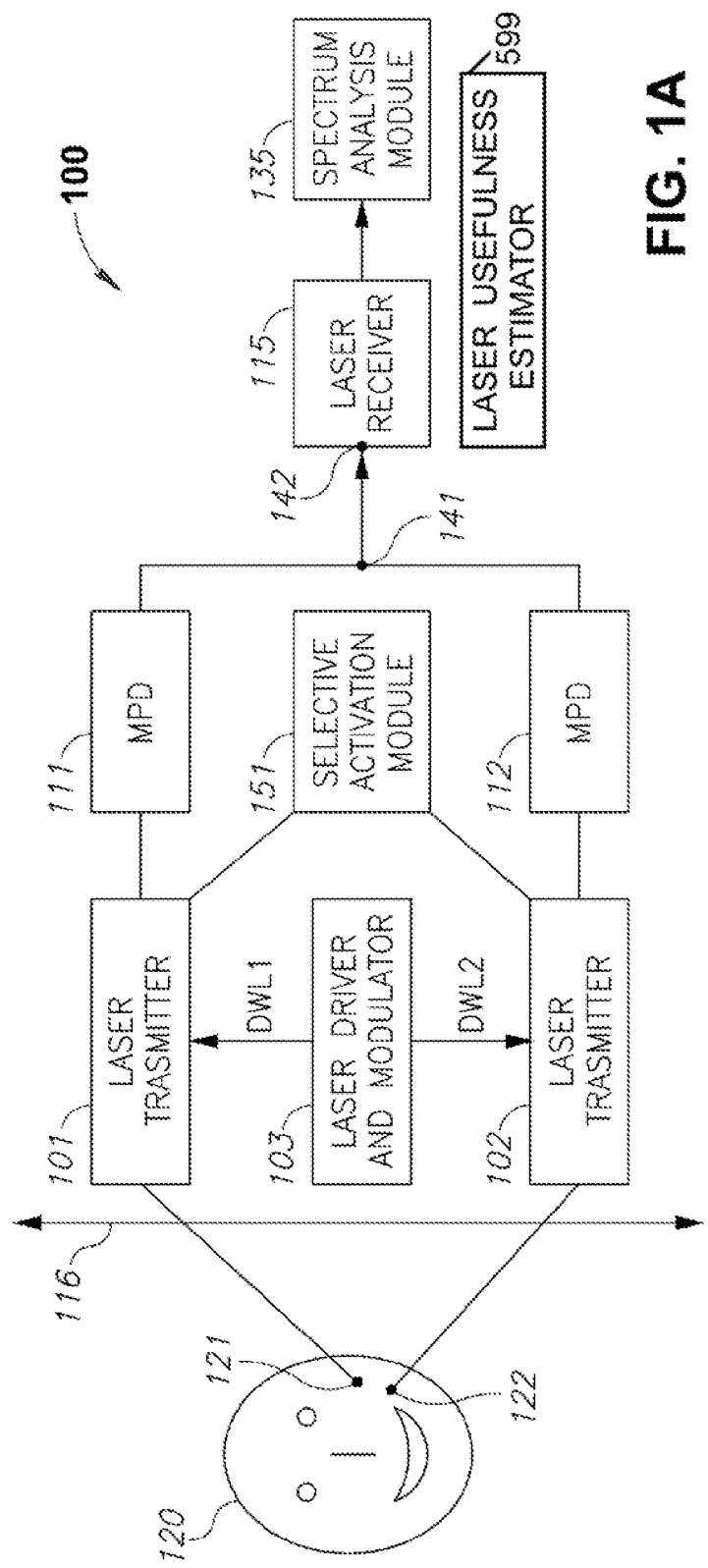
FIG. 1A is a schematic illustration of a laser system, in accordance with some demonstrative embodiments of the present invention.

The Applicants have realized that it may be beneficial to utilize an optical microphone or laser microphone or laser-based microphone, by itself and/or as part of a hybrid system or hybrid device that also comprises an acoustic microphone. The Applicants have further realized that it may be beneficial to utilize an optical microphone or laser microphone or laser-based microphone that has multiple laser drives (or multiple laser drivers, or multiple laser transmitters), in order to improve the efficiency and/or the accuracy of such microphone, or of such hybrid device or system. The Applicants have also realized that multiple laser transmitters may be connected to a single Monitor Photodiode (MPD) which may then feed a single laser receiver; or alternatively, that multiple laser transmitters may be connected to multiple, separate, MPDs which may then produce electric signals that may be shorted or connected to each other prior to entering (or, at the entrance to) a single laser receiver. The Applicants have realized that these embodiments of the present invention may operate, for example, in conjunction with two-or-more laser transmitters that have different, respective, self-mix carrier frequency (or frequencies).

The Applicants have realized that self-mix (SM) techniques, or a self-mix module or chamber, typically utilize a single laser beam that is associated with a single laser drive (or laser driver) and a single laser receiver. The Applicants have realized that it may be beneficial to utilize multiple lasers or multiple laser beams, in order to improve or enhance the efficiency of self-mix techniques or modules or chambers. Furthermore, the Applicants have realized that it may be beneficial to utilize multiple lasers or multiple laser beams or multiple laser transmitters, in conjunction with a single laser drive component and/or a single laser receiver component.

Some embodiments of the present invention may comprise an optical microphone or laser microphone or a laser-based microphone, or optical sensor or laser sensor or laser-based sensor, which utilizes multiple lasers or multiple laser beams or multiple laser transmitters, in conjunction with a single laser drive component and/or a single laser receiver component, thereby increasing or improving the efficiency of self-mix techniques or module or chamber (or self-mix interferometery techniques or module or chamber) utilized by such optical or laser-based microphone or sensor.

Some embodiments of the present invention may comprise, or may be implemented as, for example: a monolithically integrated laser and a sensor, or monolithically integrated lasers and sensors, or a monolithically integrated lasers array and a sensor.

Some embodiments of the present invention may comprise a hybrid sensor or hybrid device or hybrid unit or hybrid microphone, for example, an acoustic/optical sensor or acoustic/optical microphone, which may comprise: (a) an acoustic microphone or audio microphone; and also (b) an optical microphone or laser microphone or a laser-based microphone which utilizes multiple lasers or multiple laser beams or multiple laser transmitters, in conjunction with a single laser drive component and/or a single laser receiver component. Optionally, optical feedback received by the laser microphone, may be used in order to improve, enhance, filter and/or clean noises from the acoustic signal captured by the acoustic microphone.

The terms "laser" or "laser transmitter" as used herein may comprise or may be, for example, a stand-alone laser transmitter, a laser transmitter unit, a laser generator, a component able to generate and/or transmit a laser beam or a laser ray, a laser drive, a laser driver, a laser transmitter associated with a modulator, a combination of laser transmitter with modulator, a combination of laser driver or laser drive with modulator, or other suitable component able to generate a laser beam.

Some embodiments of the present invention may provide or may comprise a laser-based device or apparatus or system, a laser-based microphone or sensor, a laser microphone or sensor, an optical microphone or sensor, a hybrid acoustic-optical sensor or microphone, a combined acoustic-optical sensor or microphone, and/or a system that comprises or utilizes one or more of the above.

In some embodiments, multiple (two or more) laser transmitters are connected to a single monitor photodiode (MPD); which in turn outputs a single electric signal into a single laser receiver, which may convert the electric signal to a spectrum.

In some embodiments, multiple (two or more) laser transmitters are connected separately to multiple (two or more) respective MPDs; which in turn output multiple electric signals, that are then shorted together or connected together prior to entering (or at the entrance of) a single laser receiver, which may convert the electric signal to a spectrum. Optionally, a beam splitter or other suitable element may be used in such configuration. Alternatively, the MPDs may be monolithically integrated within the lasers structure.

In accordance with the present invention, the first laser transmitter has a first self-mix carrier frequency; and the second laser transmitter has a second, different, self-mix carrier frequency. Similarly, if K laser transmitters are used together with a single laser receiver (e.g., through a single MPD, or through multiple MPDs whose outputs are shorted together), them K different self-mix carrier frequencies are used and characterized the respective K laser transmitters; in order to enable the single laser receiver to correctly service (or be associated with) the multiple laser transmitters.

In some embodiments, the multiple laser transmitters may have multiple different self-mix carrier frequencies by using one or more suitable methods or circuits; for example, by changing or modifying or differently modulating the wavelength of each laser transmitter, thereby affecting or modifying or distinguishing the self-mix carrier frequency of each laser transmitter; by changing the physical properties of each laser transmitter (e.g., the radius or the diameter, or the dimensions, of the physical hardware component that emits or generates the laser beam), by changing the operational temperature of each laser transmitter (e.g., by heating-up or cooling-down one or more of the laser transmitters, thereby causing a change in the wavelength, thereby causing a change in the self-mix carrier frequency), by changing or setting differently the resistance of each laser transmitter, and/or by other suitable methods or circuits.

In some embodiments, each one of the multiple laser transmitters, is operationally associated with its own, separate, modulator; which provides its laser transmitter with a unique, different, modulation; thereby ensuring that each laser transmitter has a different and unique self-mix carrier frequency, relative to the other laser transmitters.

In some embodiments, the multiple laser transmitters are operationally associated with a single modulator, which may still be able to ensure that each laser transmitter has a different and unique self-mix carrier frequency, relative to the other laser transmitters; for example, by modulating each laser transmitter at a different wavelength (e.g., by utilizing resistors and/or electrical components and/or electric circuits); which in turn causes each laser transmitter to generate a laser beam having a different self-mix carrier frequency (relative to all the other laser transmitters in the apparatus).

In some embodiments, optionally, a control unit may selectively turn-off and turn-on (or, may selectively activate and de-activate) each one of the laser transmitters, separately from the other laser transmitter(s); and/or may modify, decrease and/or increase the strength or the power of each laser transmitter separately from other laser transmitter(s). For example, if a particular laser transmitter, out of two or more laser transmitter, does not "hit" the intended target, or does not produce a signal or does not produce a useful signal, or produces a low-quality signal, then the control unit may selectively deactivate such particular laser transmitter, or may reduce its power-level or its strength; for example, in order to conserve power or save power or reduce power consumption (e.g., which may be important, especially if the system or apparatus has a limited power, or is a portable or mobile device or apparatus that has an internal battery or internal power-source).

Reference is made to FIG. 1A, which is a schematic illustration of a laser system 100 in accordance with some demonstrative embodiments of the present invention.

In a first demonstrative embodiment of the present invention, two or more laser transmitters may be co-located, in proximity to each other. For demonstrative purposes, two separate, discrete, laser transmitters are shown, denoted 101 and 102; although more than two laser transmitters (namely, N laser transmitters, wherein N is a positive integer) may be used.

The multiple laser transmitters 101-102 are co-located in proximity to each other, and are packaged close to each other, and are all associated with a single laser driver and modulator 103 which is common to all of the laser transmitters 101-102.

In accordance with the present invention, each laser transmitter is connected to its own monitor photodiode (MPD); which may optionally be internal to (or comprised in, or monolithically integrated within) the laser transmitter, or alternatively may be external to (or connected to, or associated with) the laser transmitter.

For example, laser transmitter 101 is connected to its own MPD 111; which may optionally be internal to (or comprised in, or monolithically integrated within) laser transmitter 101, or alternatively may be external to (or connected to, or associated with) laser transmitter 101. Similarly, yet separately, laser transmitter 102 is connected to its own MPD 112; which may optionally be internal to (or comprised in, or monolithically integrated within) laser transmitter 102, or alternatively may be external to (or connected to, or associated with) laser transmitter 102.

All the MPDs 111-112 are shorted together, for example, at the input of a single, common, laser receiver 115 (e.g., at node 142), or prior to (or, immediately prior to) the input of the common laser receiver 115 (e.g., at node 141). Spectrum analyzer module 135 may process or analyze a spectrum and/or other characteristics of the signal(s) outputted by the laser receiver 115; for example, as described herein with reference to FIGS. 2A and 2B.

Optionally, a single lens 116 (or other optics, or other optical component or element) may focus or direct or otherwise affect all (or some of) the laser beams at the output, to be parallel or generally-parallel to each other; or alternatively, to be slightly slanted relative to each other; thereby creating multiple spots 121-122 on a target area of a target object 120. Each spot 121-122 may correspond to a "hit" by one of the multiple, discrete, separate, laser beams that originated from the multiple, discrete, separate, laser transmitters 101-102. Optionally, more than one lens may be used; or an arrangement of multiple lenses or multiple optics or multiple optical elements may be used.

The input current to the laser transmitters may be modulated by the laser driver and modulator 103, to create a self-mix (SM) carrier frequency (denoted $f_0$). The SM carrier frequency $f_0$ may depend on various parameters, including for example, a DWL parameter indicating the change in wavelength versus the change of input laser current. The value of the DWL parameter may be set or modified or configured, as a configuration parameter of the particular laser implementation being used.

Each one of the laser transmitters 101-102 has a different DWL value, and thus a different SM carrier frequency. Accordingly, for example, laser transmitter 101 has a first DWL value (DWL1) and/or has a first SM carrier frequency; whereas laser transmitter 102 has a second, different, DWL value (DWL2) and/or has a second, different, SM carrier frequency.

In accordance with the present invention, each one of the laser transmitters 101-102 has a different SM carrier frequency $f_0$ value; and the n-th SM carrier frequency may be denoted $f_{0n}$. In some embodiments, optionally, each laser transmitter may comprise a separate laser driver, having a modulation amplitude or frequency (or other functional form) independent from (and different from) the amplitude or frequency (or other functional form) of that other laser driver(s), and thus having a different, unique, SM carrier frequency for each of the lasers.

System 100 may optionally comprise a selective activation module 151, able to selectively turn-on and turn-off (or, selectively activate and de-activate) each one of the laser transmitters 101 and 102; for example, as described further herein. The selective activation module 151 may optionally comprise a power regulator or a power regulation module, to perform power regulation operations; for example, to selectively increase or decrease power provided to a laser transmitter, in addition to (or instead of) selectively activating/deactivating laser transmitter(s).

Figure 1B:
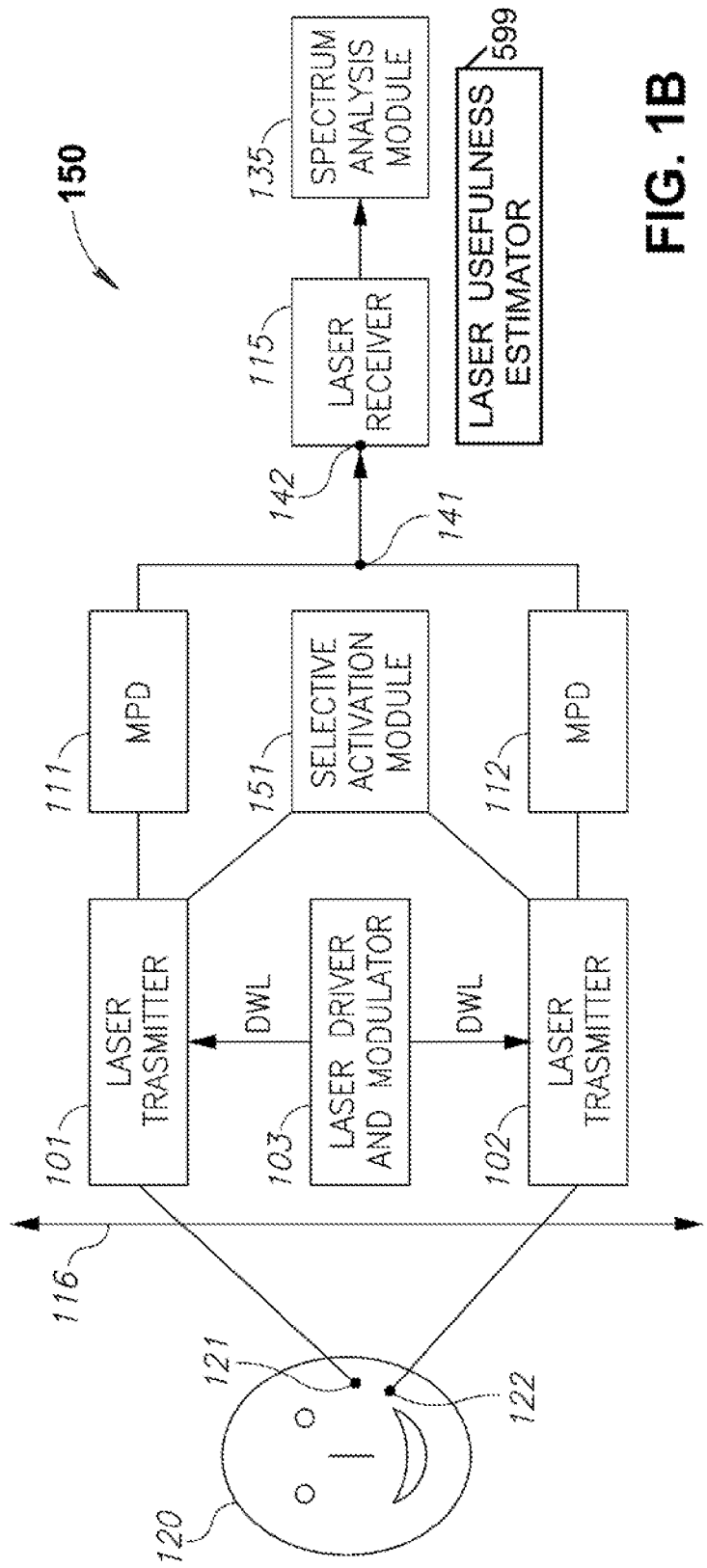
FIG. 1B is a schematic illustration of another laser system, in accordance with some demonstrative embodiments of the present invention.
Figure 1C:
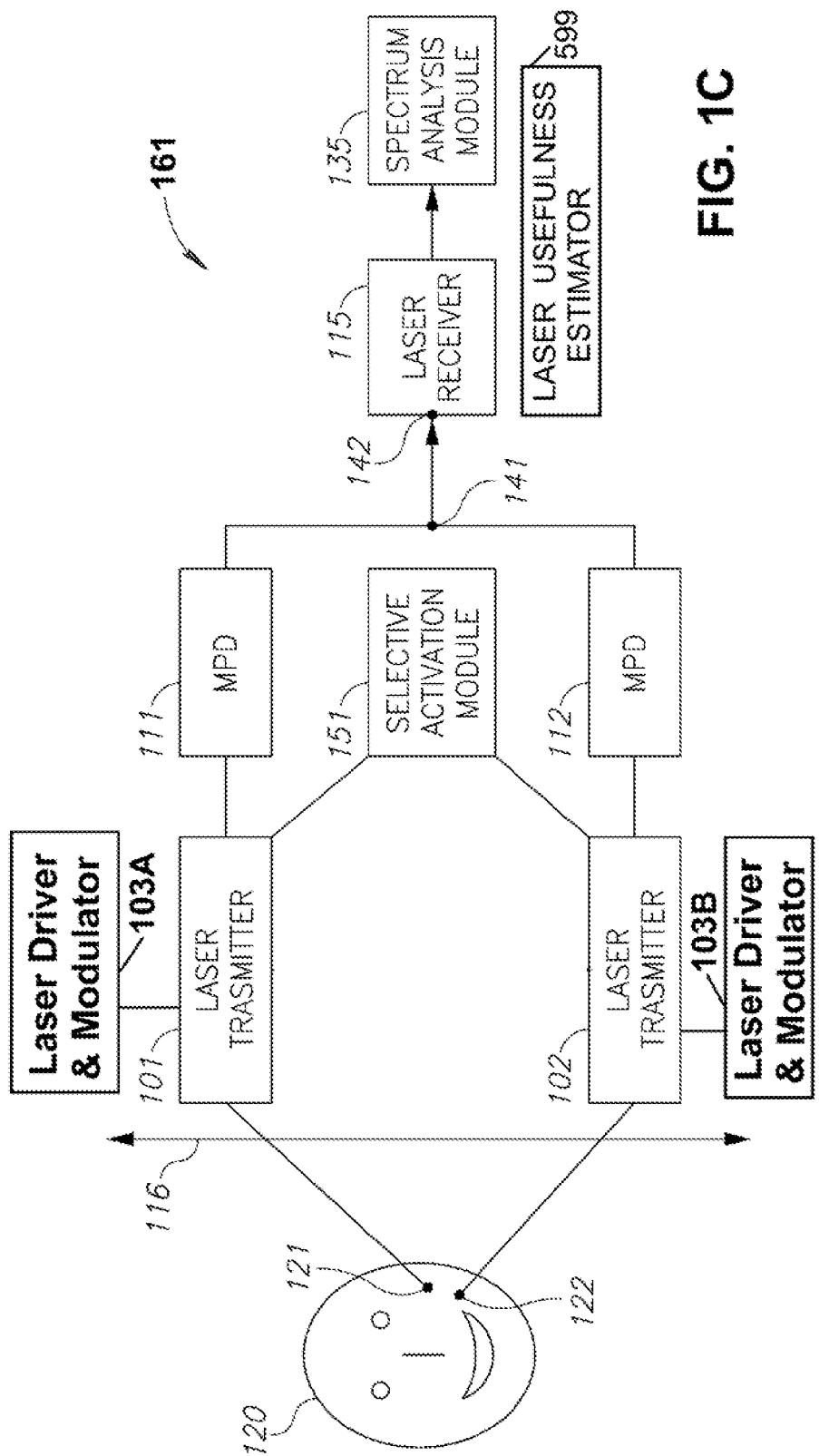
FIG. 1C is a schematic illustration of still another laser system, in accordance with some demonstrative embodiments of the present invention.

Reference is made to FIG. 1C, which is a schematic illustration of a laser system 161 in accordance with some demonstrative embodiments of the present invention. In laser system 161, instead of a single modulator, two separate "laser driver and modulator" units 103A and 103B are used: for example, laser driver and modulator 103A drives and modulates laser transmitter 101; and modulator 103B drives and modulates laser transmitter 103B. The two laser drivers and modulator units 103A and 103B ensure that each one of the laser transmitters 103A and 103B has a different self-mix carrier frequency; for example, by providing a different modulation amplitude, frequency or functional form to each laser transmitter, or by each one of the laser driver and modulator units 103A-103B utilizing a different modulating circuitry.

Figure 1D:
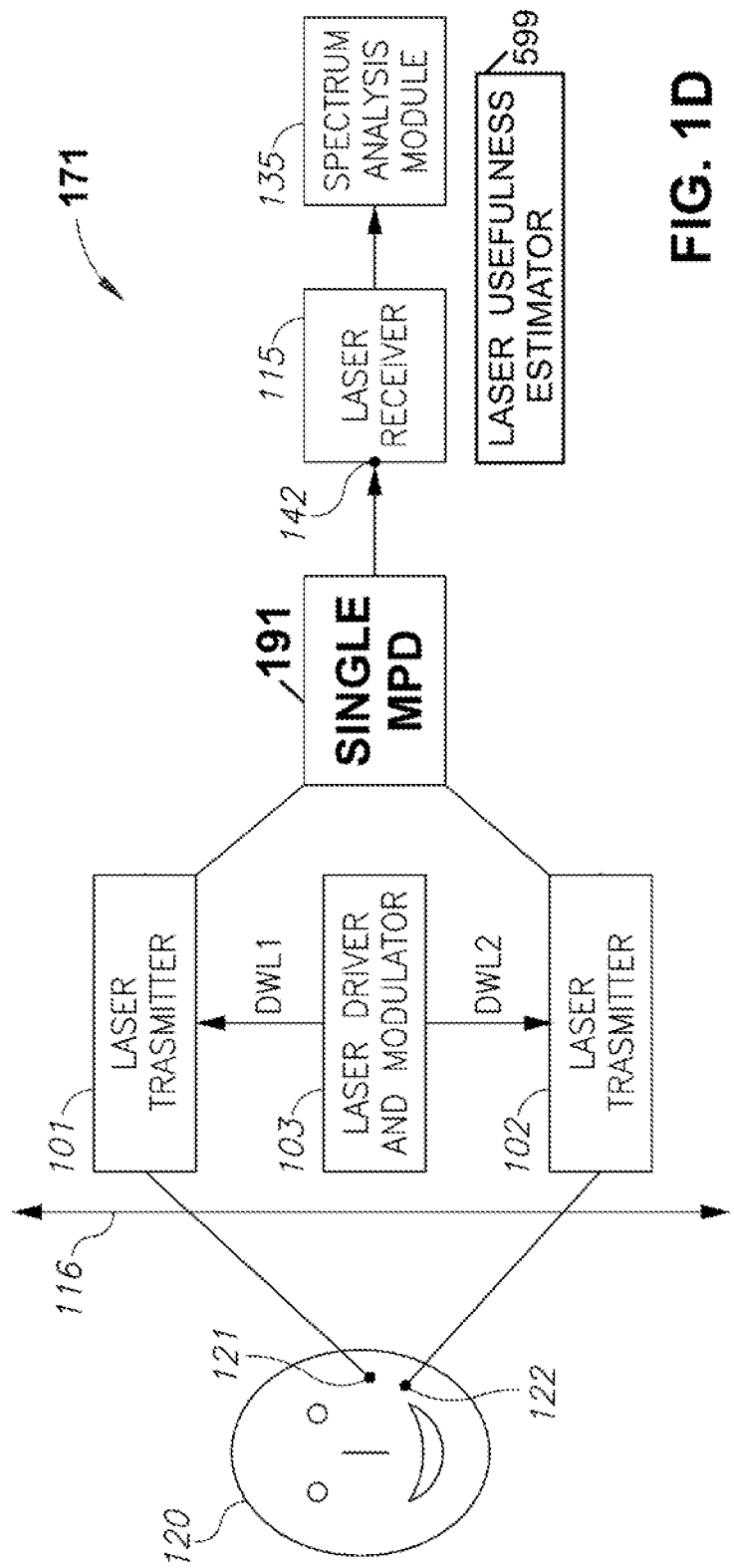
FIG. 1D is a schematic illustration of another laser system, in accordance with some demonstrative embodiments of the present invention.

Reference is made to FIG. 1D, which is a schematic illustration of a laser system 171 in accordance with some demonstrative embodiments of the present invention. Laser system 171 is generally similar to laser system 100 of FIG. 1A; but in laser system 171, a single MPD 191 is utilized in conjunction with two (or more) laser transmitters 101-102 and in conjunction with a single laser receiver 115.

Figure 1E:
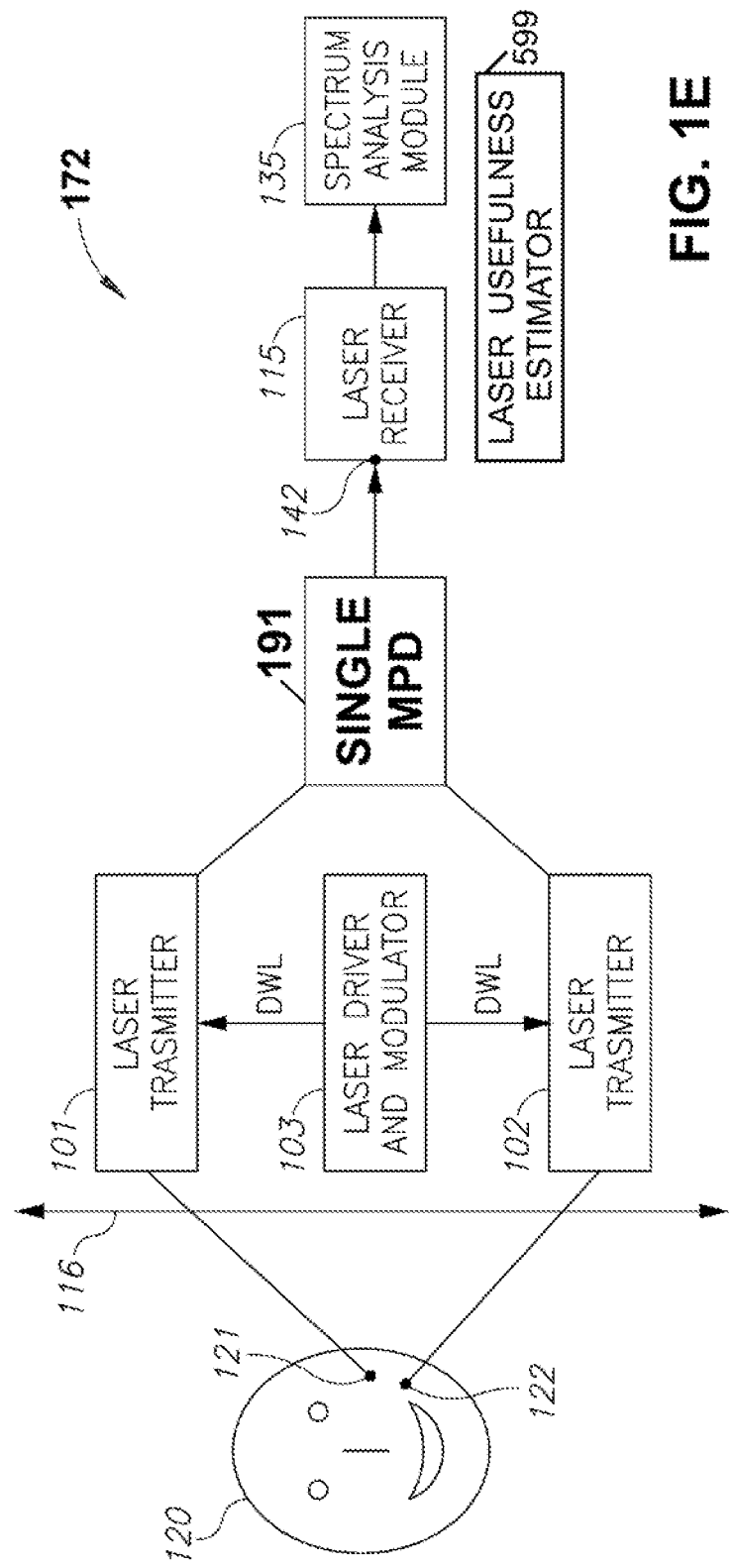
FIG. 1E is a schematic illustration of yet another laser system, in accordance with some demonstrative embodiments of the present invention.

Reference is made to FIG. 1E, which is a schematic illustration of a laser system 172 in accordance with some demonstrative embodiments of the present invention. Laser system 172 is generally similar to laser system 150 of FIG. 1B; but in laser system 172, a single MPD 191 is utilized in conjunction with two (or more) laser transmitters 101-102 and in conjunction with a single laser receiver 115.

Figure 1F:
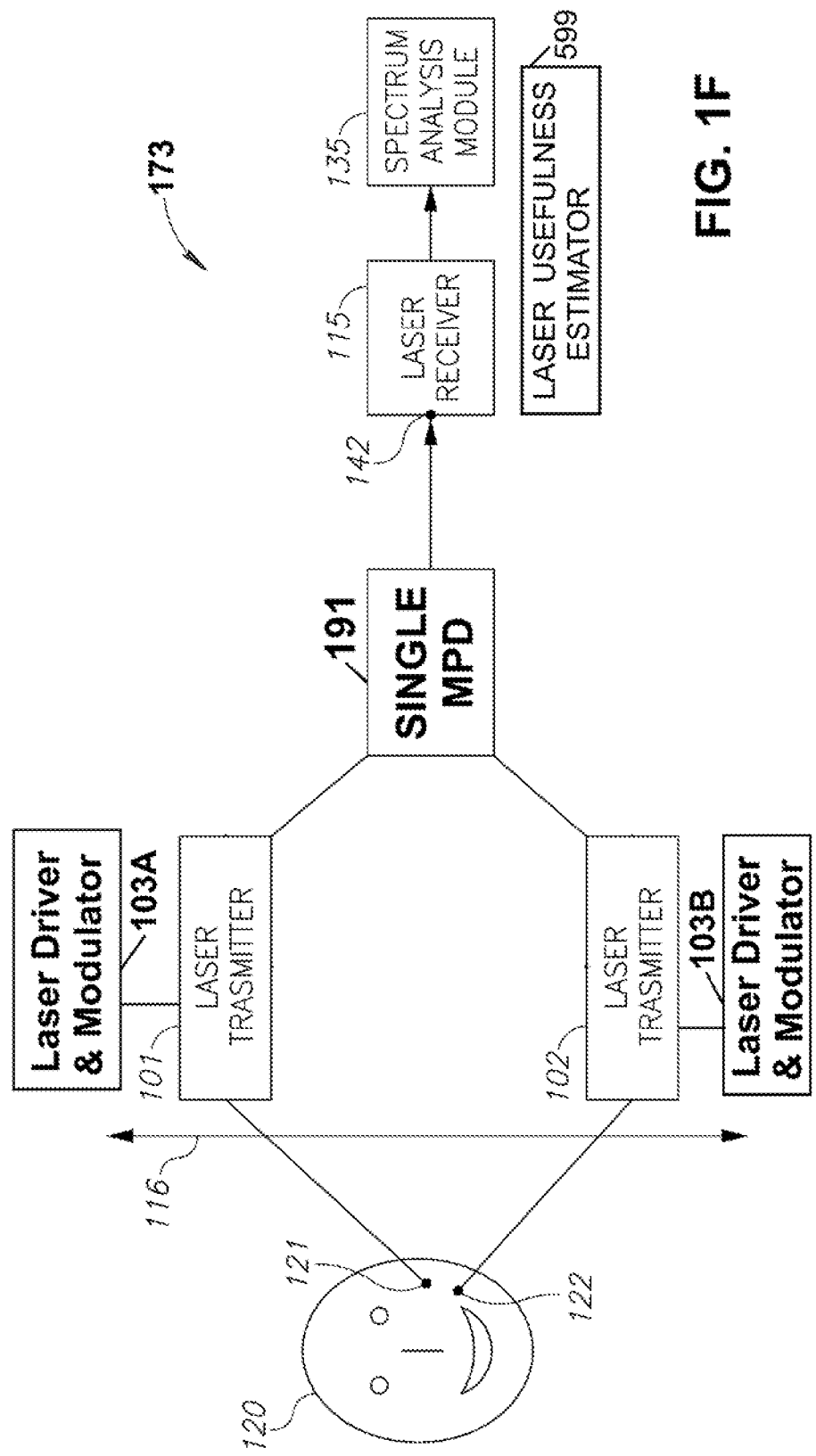
FIG. 1F is a schematic illustration of still another laser system, in accordance with some demonstrative embodiments of the present invention.

Reference is made to FIG. 1F, which is a schematic illustration of a laser system 173 in accordance with some demonstrative embodiments of the present invention. Laser system 173 is generally similar to laser system 161 of FIG. 1C; but in laser system 173, a single MPD 191 is utilized in conjunction with two (or more) laser transmitters 101-102 that are driven and modulated by two separate "laser driver and modulator" units 103A-103B, and in conjunction with a single laser receiver 115.

It is noted that the systems of FIG. 1D, FIG. 1E and/or FIG. 1F, may further comprise and/or may utilize a beam splitter or other suitable component(s); for example, as shown in FIG. 3B and/or as described herein with reference to FIG. 3B.

Figure 2A:
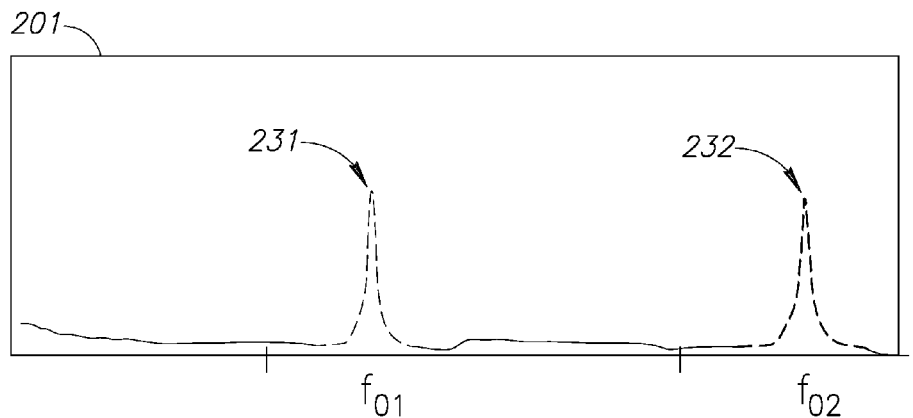
FIG. 2A is a schematic illustration of a spectrum chart, in accordance with some demonstrative embodiments of the present invention.
Figure 2B:
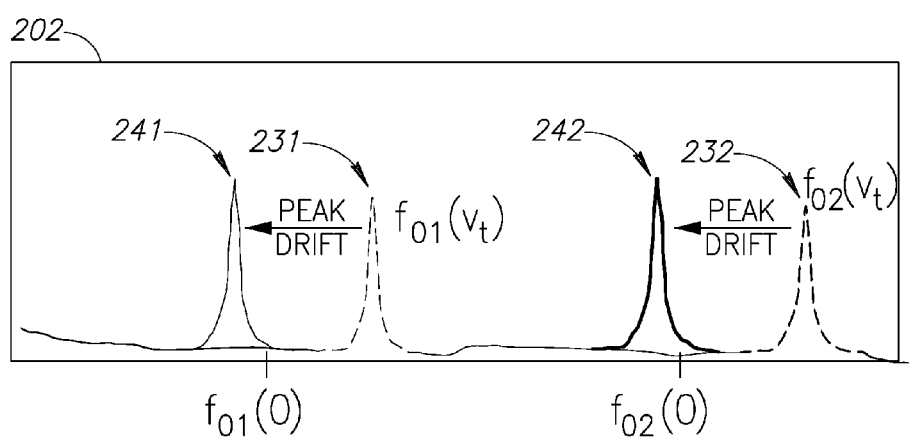
FIG. 2B is a schematic illustration of another spectrum chart, in accordance with some demonstrative embodiments of the present invention.

Reference is made to FIG. 2A, which is a schematic illustration of a spectrum chart 201 of the signal(s) received and/or processed by a laser-based system (e.g., by utilizing the single laser receiver 115, or, by two laser receivers), from a static (non-vibrating, non-moving, speaking) target, in accordance with some demonstrative embodiments of the present invention. Reference is also made to FIG. 2B, which is a schematic illustration of a spectrum chart 202 of the signal(s) received and/or processed by a laser-based system (e.g., by utilizing the single laser receiver 115, or, by two laser receivers), from a non-static (vibrating, moving, speaking) target, in accordance with some demonstrative embodiments of the present invention.

As demonstrated by spectrum chart 201, the Applicants have observed the signal on the raising section of the triangle input modulation with a static target. In the demonstrative resulting spectrum of chart 201, of the received signal from a static target (e.g., after removing the carrier signal or the modulation envelope), two (or more) peaks 231 and 232 exist, corresponding to each one of the two (or more) laser beams transmitted by the two (or more) discrete laser transmitters 101-102.

As demonstrated by spectrum chart 202, once the target vibrates (e.g., the target being a mouth-area or face-area of a human speaker, and the speaker speaks or utters sound), each one of peaks 231 and 232 may independently shift or move or "drift" to upper or lower frequency, according to the target velocity $v_t(t)$. For example, peak 231 may drift to become peak 241; and similarly, peak 232 may drift in the same drift direction, to become peak 242. The shift or drift of each peak may be monitored and measured, and may be transformed into the measurement of $v_t(t)$. For example, the peak location may be found by finding the local maxima of the digitally-computed Fast Fourier Transform (FFT) spectrum. The target speed $v_t(t)$ may be calculated from the peak frequency difference $\Delta f_0(t)$, for example, by using the following equation, in which $\lambda$ is the wavelength:

$$v_t(t) = \Delta f_0(t) * \lambda / 2$$

It is noted that, as realized and observed by the Applicants, when the two laser transmitters 101-102 are aimed or are directed towards the same target (e.g., the same speaker or face or mouth-area), then, the spectrum shifts or drifts in the same direction, and the shifting or drifting of the peaks 231-232 does not cause any mixing or re-ordering or shuffling of the two "drifted" peaks 241-242.

Reference is now made to FIG. 1B, which is a schematic illustration of a laser system 150 in accordance with some other demonstrative embodiments of the present invention. System 150 may be generally similar to system 100 of FIG. 1A; however, in system 150 each one of the laser transmitters 101-102 has the same DWL value (denoted DWL), instead of different DWL values for the different laser transmitters 101-102 as in FIG. 1A. In system 150, the spectral separation between the multiple lasers is obtained by using resistors and/or circuitry to ensure that each one of laser transmitters 101-102 has a different SM carrier frequency; optionally by utilizing different hardware properties (e.g., hardware size, radius or diameter of laser transmitter) for each one of the laser transmitters 101-102.

System 150 may optionally comprise a selective activation module 151, able to selectively turn-on and turn-off (or, selectively activate and de-activate) each one of the laser transmitters 101 and 102. The selective activation and de-activation may be based on a pre-defined scheme or a dynamically-generated scheme, for example, based on the relative usage of each laser, or based on the relative usefulness of the feedback received from each laser; and/or in order to reduce power consumption and/or increase Signal to Noise Ratio (SNR). It is noted that the selective activation module 151 may similar be present, and may similarly operate, in system 100 of FIG. 1A, or in other systems described herein.

The selective activation module 151 may optionally comprise, or may be associated with, a self-mix usefulness estimator able to estimate or calculate or measure the usefulness or relative-usefulness of the optical signal of each one of the laser transmitter; and/or able to estimate a self-mix usefulness value or score, associated with each laser transmitter. For example, the selective activation module 151 may selectively activate or deactivate a laser transmitter, or may selectively regulate or selectively modify the power level provided to a laser transmitter, based on the estimated self-mix usefulness value, or if the estimated self-mix usefulness value is smaller than (or greater than) a pre-defined threshold, or is smaller than (or greater than) a pre-defined ratio relative to that of other laser transmitter(s) in the same system.

In accordance with other embodiments of the present invention, all the laser transmitters (for example, laser transmitters 101 and 102 mentioned above) may optionally have a single, common, MPD. In some embodiments, such single MPD may optionally be built-in or embedded within a VCSEL (vertical-cavity surface-emitting laser), for example, by utilizing an array of multiple laser transmitters that are co-located on a same, single, chip or Integrated Circuit (IC) or Application Specific IC (ASIC). In other embodiments, a single, common, external MPD may be associated with (or connected to) the multiple laser transmitter; and the light may be coupled via, for example, a beam splitter. Such configurations may be used in conjunction with (or, as modifications of) system 100 of FIG. 1A; or, such configurations may be used in conjunction with (or, as modifications of) system 150 of FIG. 1B.

Reference is made to FIG. 3A, which is a schematic illustration of a laser system 301, in accordance with some demonstrative embodiments of the present invention. System 300 demonstrates multiple laser diodes (e.g., laser transmitters 311-312) that are associated with, or connected to, a single built-in MPD 313. Further shown are the laser beams which may pass through an optional lens 315 or other optical element(s), on their way to hit a target 317 from which they are reflected or "bounced".

Reference is made to FIG. 3B, which is a schematic illustration of a laser system 351, in accordance with some demonstrative embodiments of the present invention. System 300 demonstrates multiple laser diodes (e.g., laser transmitters 361-362) that are associated with, or connected to, a single external MPD 363 (e.g., which is external to the multiple laser transmitters 361-362; but which may be internal to the entire system 351, or to the entire laser-microphone or optical-microphone that implements system 351). Further shown are the laser beams which may pass through an optional lens 365 or other optical element(s), on their way to hit a target 367 from which they are reflected or "bounced"; however, the outgoing laser beams, prior to hitting the target 367, may be split by a beam splitter 378 which splits and reflects them back to the single external MPD 363.

The following discussion may be applicable to any of the systems and/or components described above, and/or to any of the drawing(s). For example, the self-mix carrier frequency, denoted $f_0$, may be set or configured, or may be affected by, one or more of the following parameters and/or operations.

The laser power is modulated; for example, by adding a time-changing current to the Direct Current (DC) drive current. For example the laser drive current is modulated such that the laser changes its wavelength linearly over time. The change in laser wavelength due to change in laser current, may be referred to as dWL/dI; and this parameter may be referred to herein as "DWL".

The change in laser wavelength due to change in current is majorly or dominantly due to change(s) in the heating of the laser transmitter or laser element, and/or due to changes in the temperature of the laser transmitter or laser element, and/or due to changes in the environmental temperature in proximity to the laser transmitter or laser element, and/or due to change in the laser maximum gain wavelength, and/or due to changes in the effective laser cavity length, and/or due to changes in the laser's mirror maximal-reflectivity wavelength. In some lasers that may be used in conjunction with the present invention (for example, VCSEL or vertical-cavity surface-emitting laser), the heating of the laser transmitter or laser element may be a result from the large serial resistance of the top DBR (Distributed Bragg Reflector). This resistance (and therefore, the value of the DWL parameter) is determined or configured by the laser size (e.g., the physical size or the physical dimensions or diameter or radius of the laser component), by the number of DBR layers; by the doping of the DBR, and/or by other parameters or characteristics.

The change (e.g., linear change, or non-linear change) in laser wavelength is transforming by the self-mixing phenomena to laser power oscillating by a frequency denoted $f_0$, which depends on one or more parameters or characteristics, for example: (a) target distance (e.g., the distance between the laser transmitter and the target that the laser transmitter is aiming towards, such as, the face of a human speaker); (b) the actual wavelength of the laser; (c) the rate of wavelength change (which depends on the DWL parameter, on modulation amplitude and frequency).

In some embodiments of the present invention that utilize a laser-based system having a single laser transmitter: the modulating signal that is used is a symmetric triangle wave-form. For such waveform, for a static target, only one oscillation frequency is obtained for both rising and falling slopes of the triangle. For example, for a target at a distance of d1 centimeters, at modulation amplitude of A1 uA (peak to peak), at modulation frequency of fm1 kHz, at DWL parameter value of DWL1 nm/mA, the self-mix carrier frequency $f_0$ is denoted as $f_{01}$ kHz. However, if the target moves, the self-mix carrier frequency $f_0$ splits into two frequencies, one for each slope of the triangle waveform.

In some embodiments of the present invention that utilize a laser-based system having two laser transmitters: for a target at a distance of d1 centimeters, utilizing a single laser modulator for both lasers, that provides modulation amplitude of A1 uA at modulation frequency of fm1 kHz; the system would have: (a) a first laser transmitter with DWL parameter value of DWL1 nm/mA, and (b) a second laser transmitter with DWL parameter value of DWL2 nm/mA; such that the value of DWL2 is different from the value of DWL1. Accordingly, the value of the first carrier frequency is approximately $f_{01}$ kHz; whereas the value the second carrier frequency is approximately $f_{02}$ kHz. Then, if the target (that is hit by the laser) moves, each of the carrier frequencies again splits into two, similarly to the above.

Figure 4A:
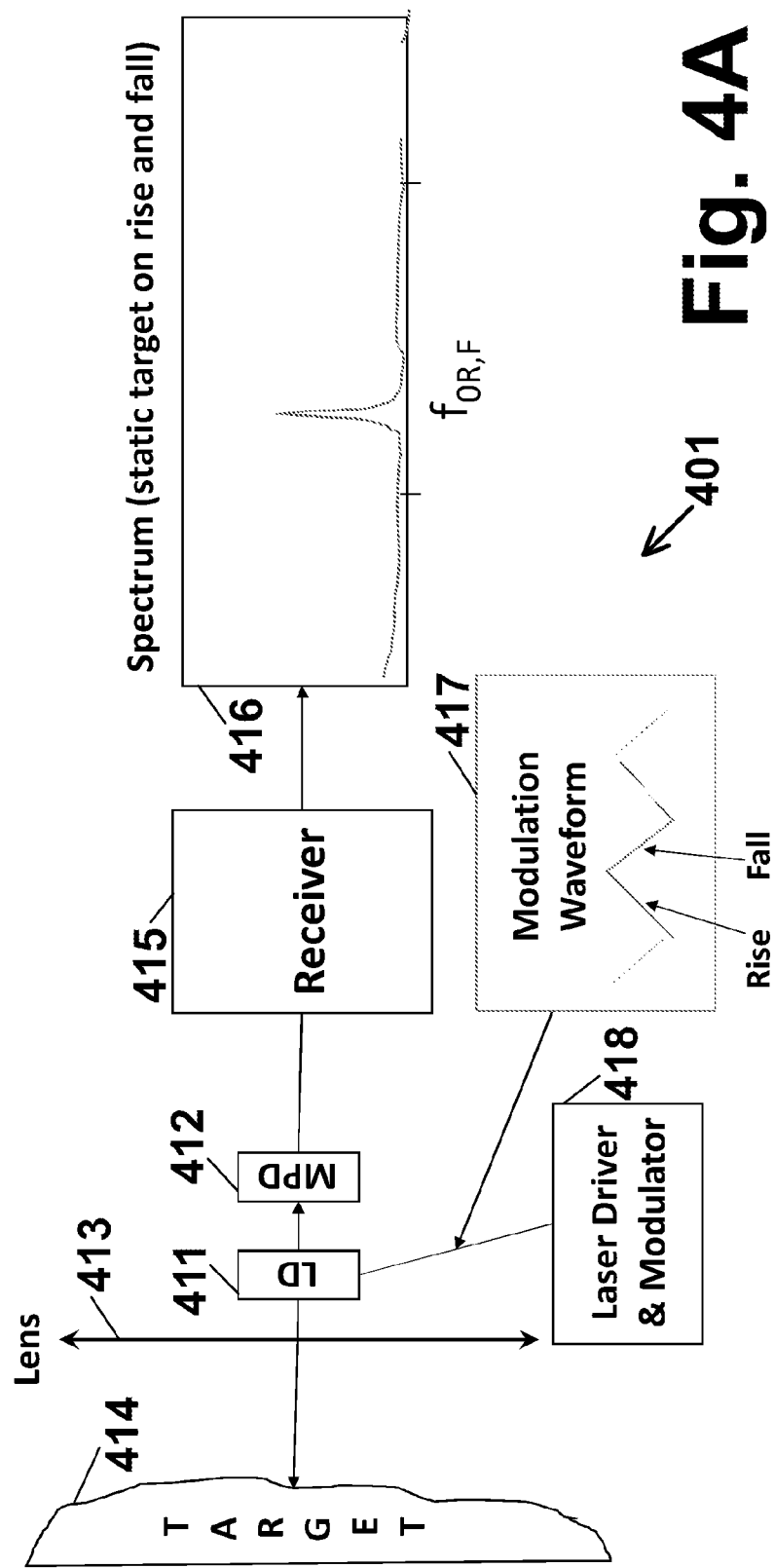
Figure 4B:
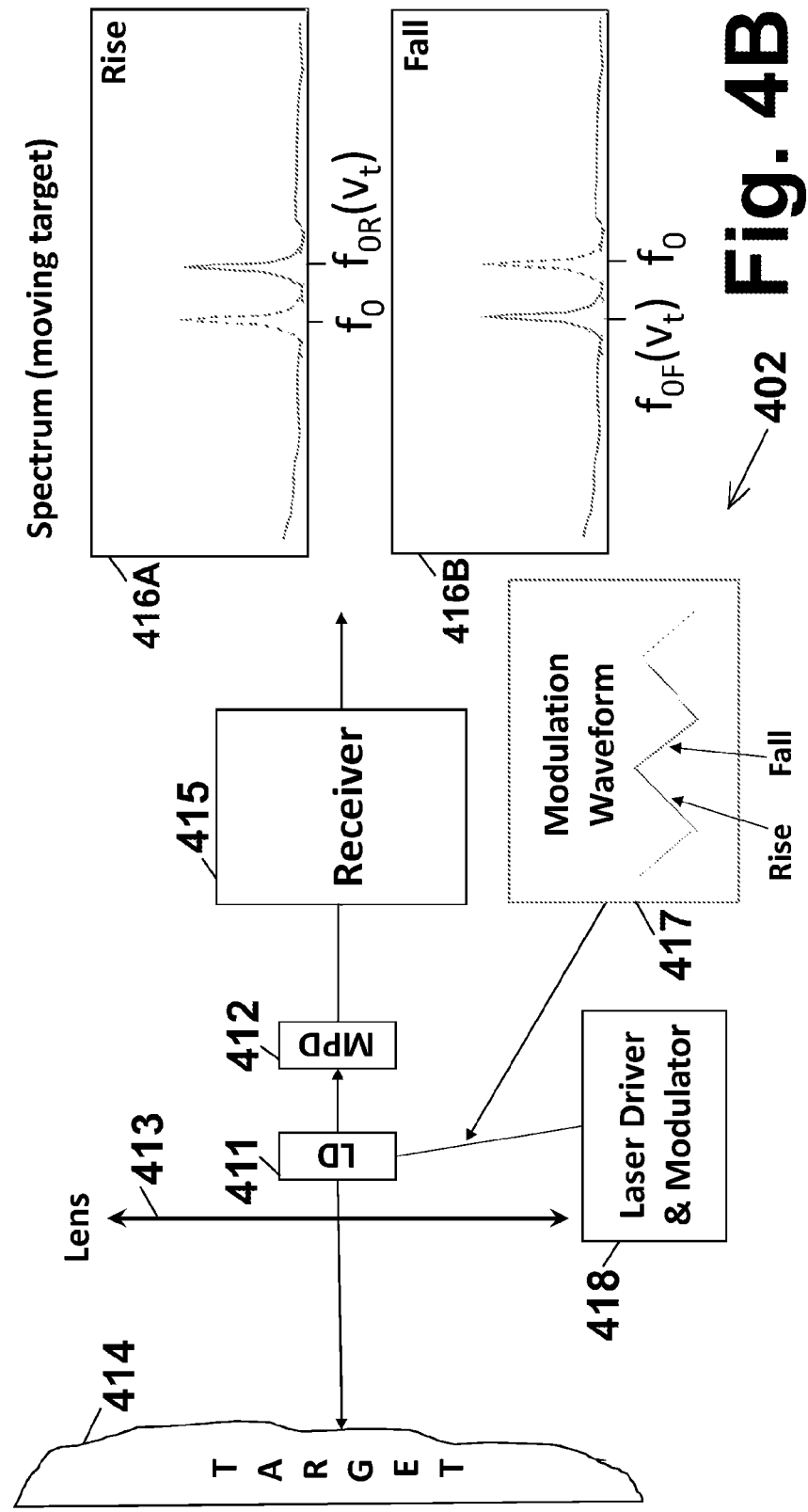
Figure 4C:
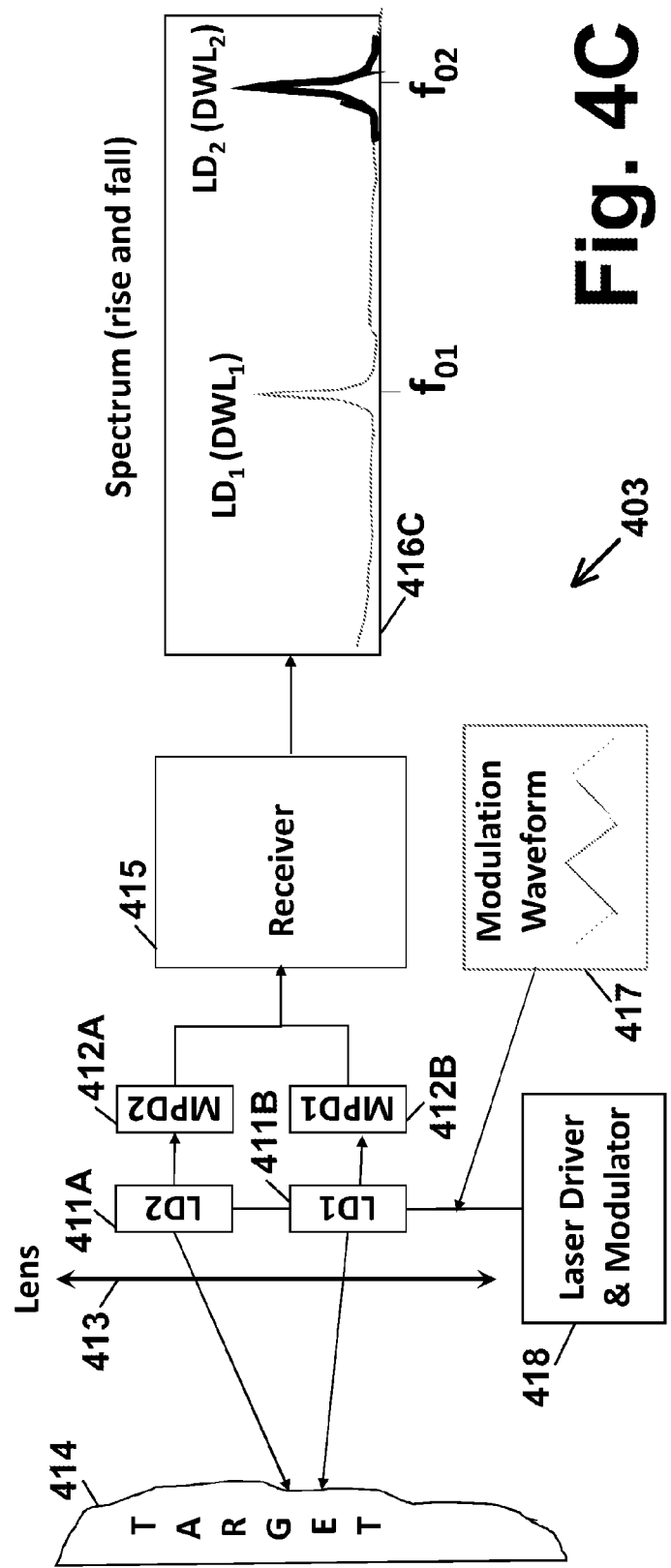

In order to demonstrate the above discussion, reference is made to the following drawings and systems: FIG. 4A, in which system 401 demonstrates a single laser transmitter operable with a static target, in accordance with some embodiments of the present invention; FIG. 4B, in which system 402 demonstrates a single laser transmitter operable with a static target, in accordance with some embodiments of the present invention; FIG. 4C, in which system 403 demonstrates two laser transmitters associated with a single laser modulator and operable with a static target, in accordance with some embodiments of the present invention; FIG. 4D, in which system 404 demonstrates two laser transmitters associated with a single laser modulator and operable with a moving target, in accordance with some embodiments of the present invention; and FIG. 4E, in which system 405 demonstrates a single laser transmitter and an optical beam splitter, in accordance with some embodiments of the present invention.

System 401 of FIG. 4A demonstrates, for example: a laser drive 411 (or laser transmitter) aiming a laser beam through a lens 413 (or other optics assembly) towards a target 414 (e.g., a face of a human speaker); a laser driver and modulator 418, generating a modulation waveform 417; a single MPD 412, and a single laser receiver 415 which results in a spectrum 416 corresponding to a static target on the rise and fall of the FFT of the received signal.

System 402 of FIG. 4B demonstrates, for example: a laser drive 411 (or laser transmitter) aiming a laser beam through lens 413 (or other optics assembly) towards target 414 (e.g., a face of a human speaker); laser driver and modulator 418, generating a modulation waveform 417; a single MPD 412, and a single laser receiver 415 which results in two split spectrums 416A (rise of the FFT) and 416B (fall of the FFT) corresponding to a moving target.

System 403 of FIG. 4C demonstrates, for example: two laser drives 411A and 411B (or two laser transmitters) aiming two laser beams through a lens 413 (or other optics assembly, or multiple lenses, or two different lenses) towards target 414 (e.g., a face of a human speaker); a single laser driver and modulator 418, generating a modulation waveform 417; two MPDs 412A and 412B that are shorted together prior to entry into a single laser receiver 415, which results in a spectrum 416C corresponding to a static target on the rise and fall of the FFT of the received signal.

System 404 of FIG. 4D demonstrates, for example: two laser drives 411C and 411D (or two laser transmitters) aiming two laser beams through a lens 413 (or other optics assembly, or multiple lenses, or two different lenses) towards target 414 (e.g., a face of a human speaker); a laser Rx component 420 and a laser Tx component 419; the resulting FFT spectrum 421 is split into two spectrums denoted 421A (FFT rise) and 421B (FFT fall), and further indicating the different dWL values in each branch.

Figure 4E:
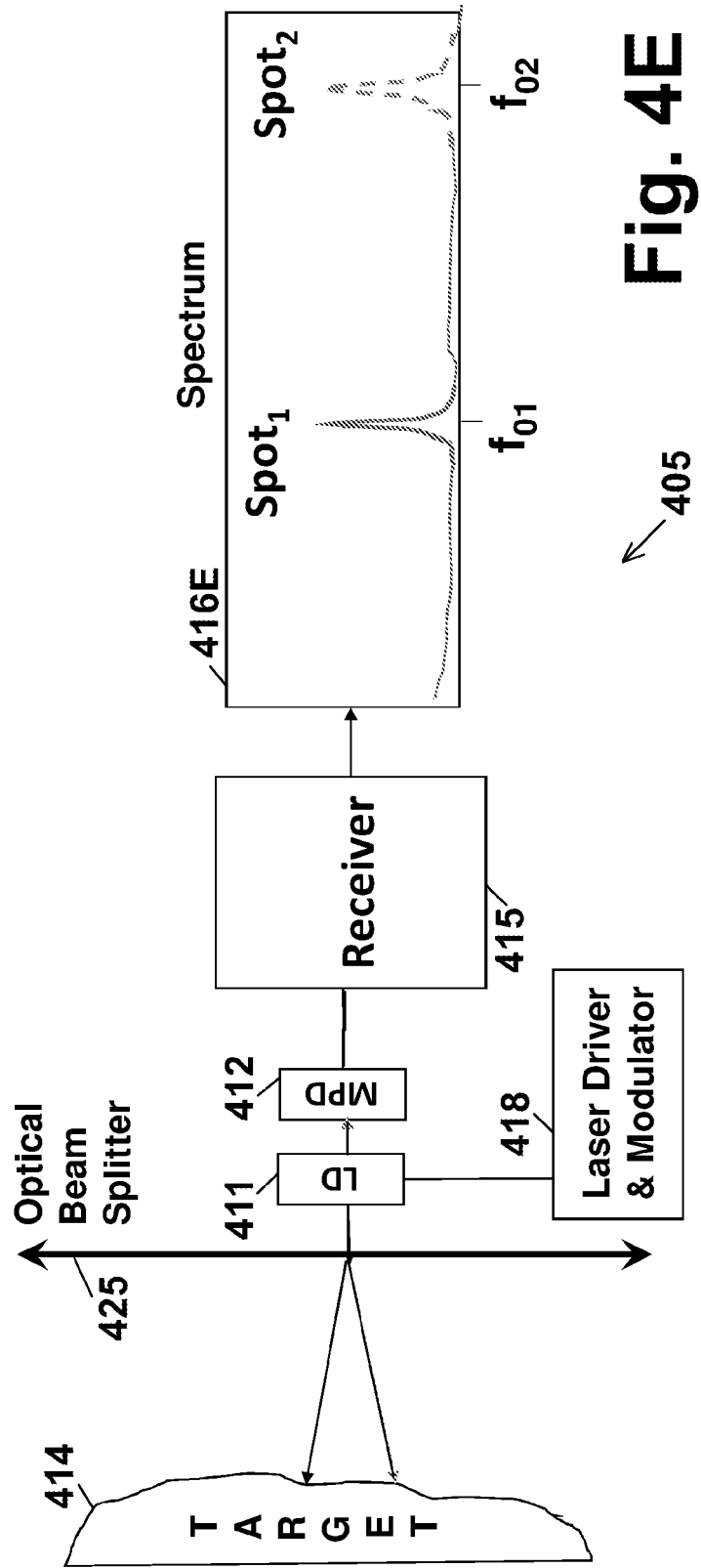

System 405 of FIG. 4E demonstrates a laser system 405 in accordance with some demonstrative embodiments of the present invention. For example, a single laser transmitter 411 with a single MPD 412 are used, with a single laser driver and modulator 418 and a single laser receiver 415; and a designated optical device (such as an optical beam splitter 425, a lens array, and/or a diffractive optical element) is utilized to split the laser beam into multiple beams that hit the target at several locations or spots, and each spot may be associated with different SM frequency which can be analyzed separately (e.g., as in FIG. 4D), as shown in spectrum 416E.

The systems of the present invention may provide one or more advantages, for example: (a) Spackle noise reduction or elimination or immunity; enabling to "hop" between spectral peaks in case one of them is lower due to dark spackle occurrence; (b) Target tracking, optionally replacing a MEMS mirror; such that utilization of multiple laser transmitters may allow a laser-based device or microphone or sensor to cover larger location(s) or multiple location(s) of a target or a speaker; (c) Increase of the working distance; for example, placing or positioning the various laser transmitters on different separation (or at different distances) from the lens, thereby creating images (or "hitting" the target) at different distances; and for each target distance, a different spectral peak is created and used; (d) Decreasing sensitivity to lens focus, and eliminating the need for active alignment, by placing or positioning the various laser transmitters on different separation (or at different distances) from the lens. Other advantageous may be achieved.

Figure 5:
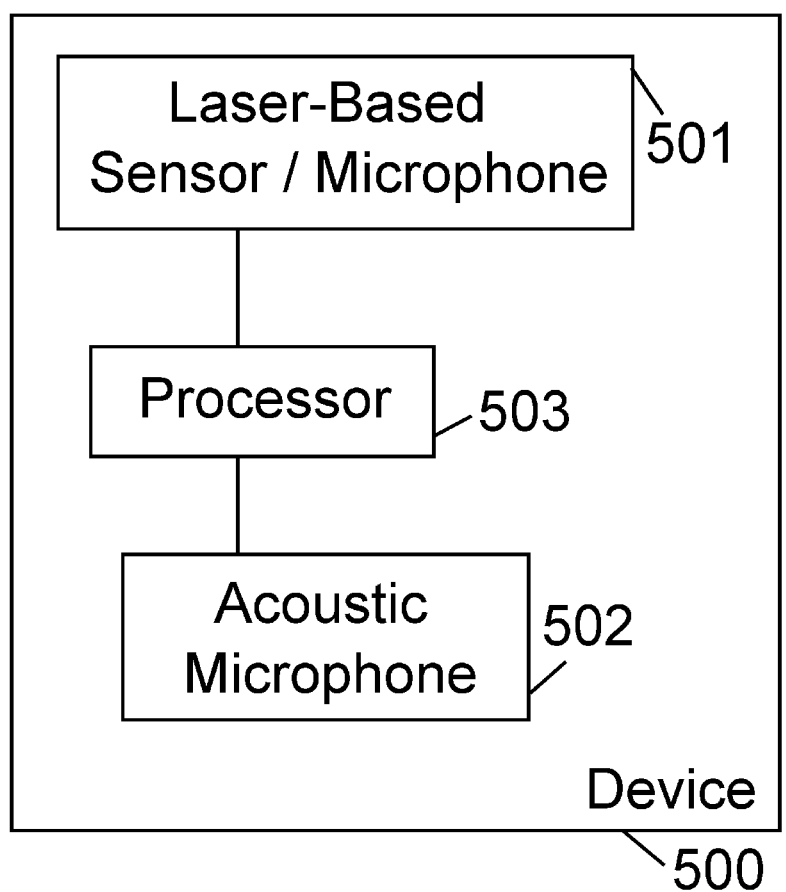
FIG. 5 is a schematic block-diagram illustration of a device, in accordance with some demonstrative embodiments of the present invention.

Reference is made to FIG. 5, which is a schematic block-diagram illustration of a device 500, in accordance with some demonstrative embodiments of the present invention. Device 500 may comprise: a laser-based sensor/microphone 501, which may comprise a laser system similar to system 100 or system 150 described above (or to other systems or sub-systems described above). Device 500 may optionally comprise also: an acoustic microphone 502 able to capture acoustic signals; and a processor 503 able to process acoustic signals captured by the acoustic microphone 502 and/or optical feedback received by the laser-based sensor/microphone 401.

Device 500 may be, or may comprise, or may be comprised in, for example: a smartphone, a cellular phone, a cordless phone, a tele-conference device or system, a video-conference device or system; an audio/video sensor; a computer, a laptop computer, a notebook computer, a desktop computer, a tablet, a gaming device, a gaming console, a navigation device, a mapping device, a route-guidance device; a vehicle, a motor vehicle, a vehicular dashboard, a vehicular component; and/or other suitable device or system.

The term "acoustic microphone" as used herein, may comprise one or more acoustic microphone(s) and/or acoustic sensor(s); or a matrix or array or set or group or batch or arrangement of multiple such acoustic microphones and/or acoustic sensors; or one or more sensors or devices or units or transducers or converters (e.g., an acoustic-to-electric transducer or converter) able to convert sound into an electrical signal; a microphone or transducer that utilizes electromagnetic induction (e.g., a dynamic microphone) and/or capacitance change (e.g., a condenser microphone) and/or piezoelectricity (e.g., a piezoelectric microphones) in order to produce an electrical signal from air pressure variations; a microphone that may optionally be connected to, or may be associated with or may comprise also, a pre-amplifier or an amplifier; a carbon microphone; a carbon button microphone; a button microphone; a ribbon microphone; an electret condenser microphone; a capacitor microphone; a magneto-dynamic microphone; a dynamic microphone; an electrostatic microphone; a Radio Frequency (RF) condenser microphone; a crystal microphone; a piezo microphone or piezoelectric microphone; and/or other suitable types of audio microphones, acoustic microphones and/or sound-capturing microphones.

The term "laser microphone" as used herein, may comprise, for example: one or more laser microphone(s) or sensor(s); one or more laser-based microphone(s) or sensor(s); one or more optical microphone(s) or sensor(s); one or more microphone(s) or sensor(s) that utilize coherent electromagnetic waves; one or more optical sensor(s) or laser-based sensor(s) that utilize vibrometry, or that comprise or utilize a vibrometer; one or more optical sensor(s) and/or laser-based sensor(s) that comprise a self-mix module, or that utilize self-mixing interferometry measurement technique (or feedback interferometry, or induced-modulation interferometry, or backscatter modulation interferometry), in which a laser beam is reflected from an object, back into the laser, and the reflected light interferes with the light generated inside the laser, and this causes changes in the optical and/or electrical properties of the laser, and information about the target object and the laser itself may be obtained by analyzing these changes.

The terms "vibrating" or "vibrations" or "vibrate" or similar terms, as used herein, refer and include also any other suitable type of motion, and may not necessarily require vibration or resonance per se; and may include, for example, any suitable type of motion, movement, shifting, drifting, slanting, horizontal movement, vertical movement, diagonal movement, one-dimensional movement, two-dimensional movement, three-dimensional movement, or the like.

In some embodiments of the present invention, which may optionally utilize a laser microphone, only "safe" laser beams or sources may be used; for example, laser beam(s) or source(s) that are known to be non-damaging to human body and/or to human eyes, or laser beam(s) or source(s) that are known to be non-damaging even if accidently hitting human eyes for a short period of time. Some embodiments may utilize, for example, Eye-Safe laser, infra-red laser, infra-red optical signal(s), low-strength laser, and/or other suitable type(s) of optical signals, optical beam(s), laser beam(s), infra-red beam(s), or the like. It would be appreciated by persons of ordinary skill in the art, that one or more suitable types of laser beam(s) or laser source(s) may be selected and utilized, in order to safely and efficiently implement the system and method of the present invention.

In some embodiments which may optionally utilize a laser microphone or optical microphone, such optical microphone (or optical sensor) and/or its components may be implemented as (or may comprise) a Self-Mix module; for example, utilizing a self-mixing interferometry measurement technique (or feedback interferometry, or induced-modulation interferometry, or backscatter modulation interferometry), in which a laser beam is reflected from an object, back into the laser. The reflected light interferes with the light generated inside the laser, and this causes changes in the optical and/or electrical properties of the laser. Information about the target object and the laser itself may be obtained by analyzing these changes.

The present invention may be utilized in, or with, or in conjunction with, a variety of devices or systems that may benefit from noise reduction and/or speech enhancement; for example, a smartphone, a cellular phone, a cordless phone, a video conference system or device, a tele-conference system or device, an audio/video camera, a web-camera or web-cam, a landline telephony system, a cellular telephone system, a voice-messaging system, a Voice-over-IP system or network or device, a vehicle, a vehicular dashboard, a vehicular audio system or microphone, a navigation device or system, a vehicular navigation device or system, a mapping or route-guidance device or system, a vehicular route-guidance or device or system, a dictation system or device, Speech Recognition (SR) device or module or system, Automatic Speech Recognition (ASR) module or device or system, a speech-to-text converter or conversion system or device, a laptop computer, a desktop computer, a notebook computer, a tablet, a phone-tablet or "phablet" device, a gaming device, a gaming console, a wearable device, a smart-watch, a Virtual Reality (VR) device or helmet or glasses or headgear, an Augmented Reality (AR) device or helmet or glasses or headgear, a device or system or module that utilizes speech-based commands or audio commands, a device or system that captures and/or records and/or processes and/or analyzes audio signals and/or speech and/or acoustic signals, and/or other suitable systems and devices.

In some embodiments of the present invention, which may optionally utilize a laser microphone or optical microphone, the laser beam or optical beam may be directed to an estimated general-location of the speaker; or to a pre-defined target area or target region in which a speaker may be located, or in which a speaker is estimated to be located. For example, the laser source may be placed inside a vehicle, and may be targeting the general location at which a head of the driver is typically located. In other embodiments, a system may optionally comprise one or more modules that may, for example, locate or find or detect or track, a face or a mouth or a head of a person (or of a speaker), for example, based on image recognition, based on video analysis or image analysis, based on a pre-defined item or object (e.g., the speaker may wear a particular item, such as a hat or a collar having a particular shape and/or color and/or characteristics), or the like. In some embodiments, the laser source(s) may be static or fixed, and may fixedly point towards a general-location or towards an estimated-location of a speaker. In other embodiments, the laser source(s) may be non-fixed, or may be able to automatically move and/or change their orientation, for example, to track or to aim towards a general-location or an estimated-location or a precise-location of a speaker. In some embodiments, multiple laser source(s) may be used in parallel, and they may be fixed and/or moving.

In some demonstrative embodiments of the present invention, which may optionally utilize a laser microphone or optical microphone, the system and method may efficiently operate at least during time period(s) in which the laser beam(s) or the optical signal(s) actually hit (or reach, or touch) the face or the mouth or the mouth-region of a speaker. In some embodiments, the system and/or method need not necessarily provide continuous speech enhancement or continuous noise reduction; but rather, in some embodiments the speech enhancement and/or noise reduction may be achieved in those time-periods in which the laser beam(s) actually hit the face of the speaker. In other embodiments, continuous or substantially-continuous noise reduction and/or speech enhancement may be achieved; for example, in a vehicular system in which the laser beam is directed towards the location of the head or the face of the driver.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

In some embodiments of the present invention, an apparatus or device of system comprises: a first laser transmitter having a first self-mix carrier frequency; a second laser transmitter having a second, different, self-mix carrier frequency; a first monitor photodiode to receive a first optical signal from the first laser transmitter, and to output a first electric signal; a second monitor photodiode to receive a first optical signal from the second laser transmitter, and to output a second electric signal; an electric connection to connect together the first electric signal and the second electric signal, forming a combined electric signal; a single laser receiver to receive the combined electric signal and to generate from it a spectrum that corresponds to both (i) optical feedback of the first laser transmitter, and (ii) optical feedback of the second laser transmitter.

In some embodiments, the first monitor photodiode is separate from the second monitor photodiode; and wherein the first and second monitor photodiodes, and the first and second laser transmitters, and the single laser receiver, are co-located within a same packaging.

In some embodiments, said electric connection, that connects together the first and second electric signal, is an electric connection located externally to the single laser receiver and prior to an entry node of the single laser receiver.

In some embodiments, the first monitor photodiode and the second monitor photodiode are shorted together at a node located between (I) the first and second monitor photodiodes, and (II) an input of said single laser receiver.

In some embodiments, said electric connection, that connects together the first and second electric signal, is an electric connection located internally within said single laser receiver.

In some embodiments, said electric connection, that connects together the first and second electric signal, is an electric connection located at an entry node of said single laser receiver.

In some embodiments, the apparatus comprises: a first laser modulator to modulate the first laser transmitter at a first waveform, and to cause the first laser transmitter to transmit a first laser beam having the first self-mix carrier; a second, separate, laser modulator to modulate the second laser transmitter at a second waveform, and to cause the second laser transmitter to transmit a second laser beam having the second self-mix carrier.

In some embodiments, the apparatus comprises: a single laser modulator connected to both the first laser transmitter and the second laser transmitter; wherein said single laser modulator utilizes a first electric circuitry to modulate the first laser transmitter at a first waveform, and to cause the first laser transmitter to transmit a first laser beam having the first self-mix carrier; wherein said single, laser modulator utilizes a second electric circuitry to modulate the second laser transmitter at a second waveform, and to cause the second laser transmitter to transmit a second laser beam having the second self-mix carrier.

In some embodiments, the apparatus comprises: a single laser modulator connected to both the first laser transmitter and the second laser transmitter; wherein said single laser modulator provides a same modulation to both the first laser transmitter and the second laser transmitter; wherein the first laser transmitter has physical diameter of a first value; wherein the second laser transmitter has physical diameter of a second, greater, value; wherein, based on the different physical diameters of the first and second laser transmitters, said first and second laser transmitters transmit respectively a first laser beam and a second laser beam having two different self-mix carrier frequencies.

In some embodiments, the apparatus comprises: a single laser modulator connected to both the first laser transmitter and the second laser transmitter; wherein said single laser modulator provides a same modulation to both the first laser transmitter and the second laser transmitter; wherein the first laser transmitter operates at a first temperature; wherein the second laser transmitter operates at a second, greater, temperature; wherein, based on different operational temperatures of the first and second laser transmitters, said first and second laser transmitters transmit respectively a first laser beam and a second laser beam having two different self-mix carrier frequencies.

In some embodiments, the apparatus comprises: a selective activation module to selectively activate and de-activate at least one of the first laser transmitter and the second laser transmitter.

In some embodiments, the apparatus comprises: a selective activation module to selectively de-activate one laser transmitter out of the first laser transmitter and the second laser transmitter, based on self-mix usefulness of optical feedback received by each one of said first and second laser transmitters.

In some embodiments, the apparatus comprises: a laser usefulness estimator to estimate self-mix usefulness of optical feedback received by the first laser transmitter; a selective activation module (a) to selectively de-activate the first laser transmitter and (b) to maintain the second laser transmitter activated, if an estimated self-mix usefulness value of the first laser transmitter is below a pre-defined threshold value.

In some embodiments, the apparatus comprises: a laser usefulness estimator (i) to estimate self-mix usefulness of optical feedback received by the first laser transmitter, and (ii) to estimate self-mix usefulness of optical feedback received by the second laser transmitter; a selective activation module (a) to selectively de-activate the first laser transmitter and (b) to maintain the second laser transmitter activated, if an estimated self-mix usefulness value of the first laser transmitter is smaller by at least a pre-defined ratio from an estimated self-mix usefulness value of the second laser transmitter.

In some embodiments, the apparatus comprises: a laser usefulness estimator 599 to estimate self-mix usefulness of optical feedback received by the first laser transmitter; a selective activation module (a) to selectively reduce a level of power provided to the first laser transmitter, while maintaining the first laser transmitter activated, and (b) to maintain a level of power provided to the second laser transmitter, if an estimated self-mix usefulness value of the first laser transmitter is below a pre-defined threshold value.

In some embodiments, the apparatus comprises: a laser usefulness estimator 599 (i) to estimate self-mix usefulness of optical feedback received by the first laser transmitter, and (ii) to estimate self-mix usefulness of optical feedback received by the second laser transmitter; a selective activation module (a) to selectively reduce a level of power provided to the first laser transmitter, while maintaining the first laser transmitter activated, and (b) to maintain a level of power provided to the second laser transmitter, if an estimated self-mix usefulness value of the first laser transmitter is smaller by at least a pre-defined ratio from an estimated self-mix usefulness value of the second laser transmitter.

In some embodiments, the apparatus comprises: a selective activation module to selective de-activate one laser transmitter out of the first laser transmitter and the second laser transmitter, and to reduce power consumption of the apparatus, based on usefulness of optical feedback of the first laser transmitter relative to usefulness of optical feedback of the second laser transmitter.

In some embodiments, the apparatus comprises: a selective activation module to selective de-activate one laser transmitter out of the first laser transmitter and the second laser transmitter, and to increase a Signal to Noise Ratio (SNR) of the apparatus, based on usefulness of optical feedback of the first laser transmitter relative to usefulness of optical feedback of the second laser transmitter.

In some embodiments, the apparatus comprises: a single lens assembly that is common to both the first laser transmitter and the second laser transmitter.

In some embodiments, the apparatus comprises: a single lens assembly that is common to both the first laser transmitter and the second laser transmitter; wherein the first laser transmitter and the second laser transmitter are located at a same distance from said single lens assembly.

In some embodiments, the apparatus comprises: a single lens assembly that is common to both the first laser transmitter and the second laser transmitter; wherein the first laser transmitter is located at a first distance from said single lens assembly; wherein the first laser transmitter is located at a second, different, distance from said single lens assembly.

In some embodiments, the apparatus comprises: a spectral analysis module configured (A) to analyze a spectrum of signals received by said single laser receiver, and (B) to identify in said spectrum a first peak and a second peak that correspond, respectively, to the first laser transmitter and the second laser transmitter.

In some embodiments, the apparatus comprises: a spectral analysis module configured (A) to analyze a spectrum of signals received by said single laser receiver, and (B) to identify in said spectrum a first peak and a second peak that correspond, respectively, to the first laser transmitter and the second laser transmitter, and (C) to monitor a drift of at least one of said first peak and said second peak in response to vibration of a remote speaker that is hit by at least one: a laser beam transmitted by the first laser transmitter, and a laser beam transmitted by the second laser transmitter.

In some embodiments, the spectral analysis module is to determine one or more characteristics of vibrations of said remote speaker, based on said drift monitored in said spectrum.

In some embodiments, the apparatus comprises a laser-based microphone.

In some embodiments, the apparatus comprises a laser-based microphone able to remotely sense vibrations of a facial-area of a human speaker while said apparatus is not in physical contact with human speaker.

In some embodiments, the apparatus comprises a laser-based microphone able to remotely sense vibrations of a facial-area of a human speaker while said apparatus is not in physical contact with human speaker; wherein the apparatus is embedded within a vehicular component of a vehicle in which said human speaker is located.

In some embodiments, the apparatus comprises a hybrid acoustic-and-optical sensor which includes at least: a laser-based microphone able to remotely sense vibrations of a facial-area of a human speaker while said apparatus is not in physical contact with human speaker; an acoustic microphone able to capture acoustic signals generated by said human speaker.

In some embodiments, the apparatus comprises a hybrid acoustic-and-optical sensor which includes at least: a laser-based microphone able to remotely sense vibrations of a facial-area of a human speaker while said apparatus is not in physical contact with human speaker; and an acoustic microphone able to capture acoustic signals generated by said human speaker; wherein the apparatus further comprises a processor to enhance the acoustic signals, that are captured by said acoustic microphone, based on vibrations of the facial-area of the human speaker that are sensed remotely by the laser-based microphone.

In some embodiments, the apparatus comprises: a third laser transmitter having a third self-mix carrier frequency, wherein the third self-mix carrier frequency is different from the first self-mix carrier frequency, wherein the third self-mix carrier frequency is different from the second self-mix carrier frequency; a third monitor photodiode to receive a third optical signal from the third laser transmitter, and to output a third electric signal; wherein said electric connection is to connect together the first electric signal and the second electric signal and the third electric signal; wherein said single laser receiver is to receive an electric signal which is a combination of the first and the second and the third electric signals, and to generate from said electric signal a spectrum that corresponds to (i) optical feedback of the first laser transmitter, and (ii) optical feedback of the second laser transmitter, and (iii) optical feedback of the third laser transmitter.

In some embodiments, the apparatus comprises: a plurality of laser transmitters that are co-located and co-packaged, and are associated with a respective plurality of separate monitor photodiodes; wherein each one of the laser transmitters has a self-mix carrier frequency that is different from any other self-mix carrier frequency of any other laser transmitter of the apparatus; wherein each one of the laser transmitters provides an optical signal to each one of the respective separate monitor photodiodes; wherein outputs of said plurality of monitor photodiodes, are connected together prior to an entry node of said single receiver.

In some embodiments, the electric connection that connects together the first electric signal and the second electric signal, and forms the combined electric signal, is an electric connection located after the entry node of said single laser receiver, and wherein each of the first and second electric signals is pre-amplified before reaching said electric connection.

In some embodiments, the apparatus comprises: a single laser modulator connected to both the first laser transmitter and the second laser transmitter; wherein said single laser modulator provides a same modulation to both the first laser transmitter and the second laser transmitter; wherein, by utilizing a Distributed Bragg Reflector (DBR) doping technique, said first and second laser transmitters transmit respectively a first laser beam and a second laser beam having two different self-mix carrier frequencies.

In accordance with some embodiments of the present invention, a system comprises: a first laser transmitter having a first self-mix carrier frequency; a second laser transmitter having a second, different, self-mix carrier frequency; a single monitor photodiode (A) to receive a first optical signal from the first laser transmitter, (B) to receive a second optical signal from the second laser transmitter, (C) to output a single electric signal that corresponds to both the first optical signal and the second optical signal; a single laser receiver to receive the single electric signal and to generate from it a spectrum that corresponds to both (i) optical feedback of the first laser transmitter, and (ii) optical feedback of the second laser transmitter.

In some embodiments, the single monitor photodiode is separate from both the first laser transmitter and the second laser transmitter.

In some embodiments, the first and second laser transmitters are co-packaged; and wherein the single monitor photodiode is integrated within the co-packaged and second laser transmitters.

In some embodiments, the first and second laser transmitters are monolithically integrated; and wherein the single monitor photodiode is also monolithically integrated within the first and second laser transmitters.

In some embodiments, the system comprises: a plurality of laser transmitters that are co-located and co-packaged, wherein all of said laser transmitters are associated with said single monitor photodiode that is external to and separate from all said laser transmitters and is internal to the system.

In some embodiments, the system comprises: a plurality of laser transmitters that are monolithically integrated; wherein all of said laser transmitters are associated with said single monitor photodiode which is also monolithically integrated within said laser transmitters.

In some embodiments, the system comprises: one or more beam splitters to split outgoing laser beams from said laser transmitters, and to direct split laser beams towards (i) a target located externally to the system, and (b) said single monitor photodiode that is external to all said laser transmitters and is internal to the system.

In some embodiments, the system comprises: a first laser modulator to modulate the first laser transmitter at a first waveform, and to cause the first laser transmitter to transmit a first laser beam having the first self-mix carrier; a second, separate, laser modulator to modulate the second laser transmitter at a second waveform, and to cause the second laser transmitter to transmit a second laser beam having the second self-mix carrier.

In some embodiments, the system comprises: a single laser modulator connected to both the first laser transmitter and the second laser transmitter; wherein said single laser modulator utilizes a first electric circuitry to modulate the first laser transmitter at a first waveform, and to cause the first laser transmitter to transmit a first laser beam having the first self-mix carrier; wherein said single, laser modulator utilizes a second electric circuitry to modulate the second laser transmitter at a second waveform, and to cause the second laser transmitter to transmit a second laser beam having the second self-mix carrier.

In some embodiments, the system comprises: a single laser modulator connected to both the first laser transmitter and the second laser transmitter; wherein said single laser modulator provides a same modulation to both the first laser transmitter and the second laser transmitter; wherein the first laser transmitter has physical diameter of a first value;

wherein the second laser transmitter has physical diameter of a second, greater, value; wherein, based on the different physical diameters of the first and second laser transmitters, said first and second laser transmitters transmit respectively a first laser beam and a second laser beam having two different self-mix carrier frequencies.

In some embodiments, the system comprises: a single laser modulator connected to both the first laser transmitter and the second laser transmitter; wherein said single laser modulator provides a same modulation to both the first laser transmitter and the second laser transmitter; wherein, by utilizing a Distributed Bragg Reflector (DBR) doping technique, said first and second laser transmitters transmit respectively a first laser beam and a second laser beam having two different self-mix carrier frequencies.

In some embodiments, the system comprises: a single laser modulator connected to both the first laser transmitter and the second laser transmitter; wherein said single laser modulator provides a same modulation to both the first laser transmitter and the second laser transmitter; wherein the first laser transmitter operates at a first temperature; wherein the second laser transmitter operates at a second, greater, temperature; wherein, based on different operational temperatures of the first and second laser transmitters, said first and second laser transmitters transmit respectively a first laser beam and a second laser beam having two different self-mix carrier frequencies.

In some embodiments, the system comprises: a selective activation module to selectively activate and de-activate at least one of the first laser transmitter and the second laser transmitter.

In some embodiments, the system comprises: a selective activation module to selectively de-activate one laser transmitter out of the first laser transmitter and the second laser transmitter, based on self-mix usefulness of optical feedback received by each one of said first and second laser transmitters.

In some embodiments, the system comprises: a laser usefulness estimator to estimate self-mix usefulness of optical feedback received by the first laser transmitter; a selective activation module (a) to selectively de-activate the first laser transmitter and (b) to maintain the second laser transmitter activated, if an estimated self-mix usefulness value of the first laser transmitter is below a pre-defined threshold value.

In some embodiments, the system comprises: a single lens assembly that is common to both the first laser transmitter and the second laser transmitter.

In some embodiments, the system comprises: a single lens assembly that is common to both the first laser transmitter and the second laser transmitter; wherein the first laser transmitter and the second laser transmitter are located at a same distance from said single lens assembly.

In some embodiments, the system comprises: a single lens assembly that is common to both the first laser transmitter and the second laser transmitter; wherein the first laser transmitter is located at a first distance from said single lens assembly; wherein the first laser transmitter is located at a second, different, distance from said single lens assembly.

In some embodiments, the system comprises: a spectral analysis module configured (A) to analyze a spectrum of signals received by said single laser receiver, and (B) to identify in said spectrum a first peak and a second peak that correspond, respectively, to the first laser transmitter and the second laser transmitter, and (C) to monitor a drift of at least one of said first peak and said second peak in response to vibration of a remote speaker that is hit by at least one: a laser beam transmitted by the first laser transmitter, and a laser beam transmitted by the second laser transmitter, and (D) to determine one or more characteristics of vibrations of said remote speaker, based on said drift monitored in said spectrum.

In some embodiments, the system comprises a laser-based microphone able to remotely sense vibrations of a facial-area of a human speaker while said system is not in physical contact with human speaker.

In some embodiments, the system comprises a hybrid acoustic-and-optical sensor which includes at least: a laser-based microphone able to remotely sense vibrations of a facial-area of a human speaker while said system is not in physical contact with human speaker; and an acoustic microphone able to capture acoustic signals generated by said human speaker; wherein the system further comprises a processor to enhance the acoustic signals, that are captured by said acoustic microphone, based on vibrations of the facial-area of the human speaker that are sensed remotely by the laser-based microphone.

In some embodiments, the system comprises: a third laser transmitter having a third self-mix carrier frequency, wherein the third self-mix carrier frequency is different from the first self-mix carrier frequency, wherein the third self-mix carrier frequency is different from the second self-mix carrier frequency; wherein said single monitor photodiode is to further receive a third optical signal from the third laser transmitter, and to output a single electric signal that corresponds to a combination of the first optical signal and the second optical signal and the third optical signal; wherein said single laser receiver is to receive the single electric signal and to generate from it a spectrum that corresponds to (i) optical feedback of the first laser transmitter, and (ii) optical feedback of the second laser transmitter, and (iii) optical feedback of the third laser transmitter.

In some embodiments, the system comprises: a plurality of laser transmitters that are co-located and co-packaged, and are associated with said single monitor photodiodes; wherein each one of the laser transmitters has a self-mix carrier frequency that is different from any other self-mix carrier frequency of any other laser transmitter of the system; wherein each one of the laser transmitters provides an optical signal to said single monitor photodiode; wherein said single monitor photodiode outputs a single combined electric signal to an entry node of said single receiver.

In some embodiments, a sensor comprises: a single laser transmitter, connected to a single monitor photodiode, connected to a single laser receiver; a single laser driver and modulator to modulate said single laser transmitter; an optics element located between the single laser transmitter and a target; wherein the single laser transmitter is to output a single laser beam; wherein the optics element splits said single laser beam into multiple laser beams that hit said target and multiple, respective, spots; wherein each of said multiple laser beams is associated with a single self-mix carrier frequency. In some embodiments, the optics element comprises at least one of: (a) a diffractive optics element, (b) a lens array.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. An apparatus comprising:
a first laser transmitter having a first self-mix carrier frequency;
a second laser transmitter having a second, different, self-mix carrier frequency;
a first monitor photodiode to receive a first optical signal from the first laser transmitter, and to output a first electric signal;
a second monitor photodiode to receive a first optical signal from the second laser transmitter, and to output a second electric signal;
an electric connection to connect together the first electric signal and the second electric signal, forming a combined electric signal;
a single laser receiver to receive the combined electric signal and to generate from it a spectrum that corresponds to both (i) optical feedback of the first laser transmitter, and (ii) optical feedback of the second laser transmitter;
a laser usefulness estimator to estimate self-mix usefulness of optical feedback received by the first laser transmitter;
a selective activation module (a) to selectively reduce a level of power provided to the first laser transmitter, while maintaining the first laser transmitter activated, and (b) to maintain a level of power provided to the second laser transmitter, if an estimated self-mix usefulness value of the first laser transmitter is below a pre-defined threshold value.

2. An apparatus comprising:
a first laser transmitter having a first self-mix carrier frequency;
a second laser transmitter having a second, different, self-mix carrier frequency;
a first monitor photodiode to receive a first optical signal from the first laser transmitter, and to output a first electric signal;
a second monitor photodiode to receive a first optical signal from the second laser transmitter, and to output a second electric signal;
an electric connection to connect together the first electric signal and the second electric signal, forming a combined electric signal;
a single laser receiver to receive the combined electric signal and to generate from it a spectrum that corresponds to both (i) optical feedback of the first laser transmitter, and (ii) optical feedback of the second laser transmitter;
a laser usefulness estimator (i) to estimate self-mix usefulness of optical feedback received by the first laser transmitter, and (ii) to estimate self-mix usefulness of optical feedback received by the second laser transmitter;
a selective activation module (a) to selectively reduce a level of power provided to the first laser transmitter, while maintaining the first laser transmitter activated, and (b) to maintain a level of power provided to the second laser transmitter, if an estimated self-mix usefulness value of the first laser transmitter is smaller by at least a pre-defined ratio from an estimated self-mix usefulness value of the second laser transmitter.

* * * * *